US009191082B2

(12) United States Patent
Choi et al.

(10) Patent No.: US 9,191,082 B2
(45) Date of Patent: Nov. 17, 2015

(54) APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

(71) Applicant: LG Electronics Inc., Seoul (KR)

(72) Inventors: Jinyong Choi, Seoul (KR); Byounggill Kim, Seoul (KR); Woochan Kim, Seoul (KR); Jaehyung Kim, Seoul (KR); Woosuk Ko, Seoul (KR); Sungryong Hong, Seoul (KR); Chulkyu Mun, Seoul (KR); Jaeho Hwang, Seoul (KR); Jongseob Baek, Seoul (KR); Kookyeon Kwak, Seoul (KR); Sangchul Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/256,817

(22) Filed: Apr. 18, 2014

(65) Prior Publication Data

US 2014/0314177 A1 Oct. 23, 2014

Related U.S. Application Data

(60) Provisional application No. 61/814,323, filed on Apr. 21, 2013, provisional application No. 61/841,412, filed on Jun. 30, 2013, provisional application No. 61/883,957, filed on Sep. 27, 2013, provisional application No. 61/968,367, filed on Mar. 21, 2014.

(51) Int. Cl.
*H04B 1/38* (2015.01)
*H04B 7/04* (2006.01)
*H04B 7/10* (2006.01)

(52) U.S. Cl.
CPC ............... *H04B 7/0413* (2013.01); *H04B 7/10* (2013.01)

(58) Field of Classification Search
USPC .................................................. 375/295, 316
See application file for complete search history.

(56) References Cited

U.S. PATENT DOCUMENTS

| 2002/0199210 A1* | 12/2002 | Shi et al. ........................ 725/144 |
| 2004/0255221 A1* | 12/2004 | Shen et al. .................... 714/752 |
| 2007/0071121 A1 | 3/2007 | van Rooyen |

(Continued)

FOREIGN PATENT DOCUMENTS

| WO | 2011096703 A2 | 8/2011 |
| WO | 2011096773 A2 | 8/2011 |
| WO | 2011099732 A2 | 8/2011 |

*Primary Examiner* — Dac Ha
*Assistant Examiner* — Janice Tieu
(74) *Attorney, Agent, or Firm* — Dentons US LLP

(57) ABSTRACT

The present invention provides a method of transmitting broadcast signals. The method includes, formatting input streams into Data Pipe, DP, data; Low-Density Parity-Check, LDPC, encoding the DP data according to a code rate; bit interleaving the LDPC encoded DP data; mapping the bit interleaved DP data onto constellations according to one of QAM (Quadrature Amplitude Modulation), NUQ (Non-Uniform QAM) or NUC (Non-Uniform Constellation); Multi-Input Multi-Output, MIMO, encoding the mapped DP data by using a MIMO encoding matrix having a MIMO encoding parameter; building at least one signal frame by mapping the MIMO encoded DP data; and modulating data in the built signal frame by an Orthogonal Frequency Division Multiplexing, OFDM, method and transmitting the broadcast signals having the modulated data.

12 Claims, 33 Drawing Sheets

(56) References Cited

U.S. PATENT DOCUMENTS

2008/0247488 A1* 10/2008 Li et al. .................. 375/299
2009/0110091 A1* 4/2009 Taylor et al. ............ 375/260
2011/0019753 A1* 1/2011 Ko et al. .................. 375/260
2011/0131464 A1* 6/2011 Ko et al. .................. 714/752
2013/0166992 A1* 6/2013 Shinohara et al. ....... 714/766

* cited by examiner

| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

FIG. 13

| Content | Bits |
|---|---|
| PREAMBLE_DATA<br>NUM_FRAME_FRU<br>PAYLOAD_TYPE<br>NUM_FSS<br>SYSTEM_VERSION | 20<br>2<br>3<br>2<br>8 |
| CELL_ID<br>NETWORK_ID<br>SYSTEM_ID | 16<br>16<br>16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4<br> |
| PLS2_FEC_TYPE<br>PLS2_MOD<br>PLS2_SIZE_CELL<br>PLS2_STAT_SIZE_BIT<br>PLS2_SYN_SIZE_BIT<br>PLS2_REP_FLAG<br>PLS2_REP_SIZE_CELL<br>PLS2_NEXT_FEC_TYPE<br>PLS2_NEXT_MODE<br>PLS2_NEXT_REP_FLAG<br>PLS2_NEXT_REP_SIZE_CELL<br>PLS2_NEXT_REP_STAT_SIZE_BIT<br>PLS2_NEXT_REP_DYN_SIZE_BIT<br>PLS2_AP_MODE<br>PLS2_AP_SIZE_CELL<br>PLS2_NEXT_AP_MODE<br>PLS2_NEXT_AP_SIZE_CELL | 2<br>3<br>15<br>14<br>14<br>1<br>15<br>2<br>3<br>1<br>15<br>14<br>14<br>2<br>15<br>2<br>15 |
| RESERVED<br>CRC 32 | 32<br>32 |

FIG. 14

| Content | Bits |
|---|---|
| FIC_FLAG | 1 |
| AUX_FLAG | 1 |
| NUM_DP | 6 |
| for i = 1: NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1 : NUM_AUX | |
|         AUX_STREAM_TYPE | 4 |
|         AUX_PRIVATE_CONF | 28 |
|     end | |
| end | |

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1: NUM_DP | |
|     DP_ID | 6 |
|     DP_START | 15 (or 13) |
|     DP_NUM_BLOCK | 10 |
|     RESERVED | 8 |
| end | |
| EAC_FLAG | 1 |
| EAS_WAKE_UP_VERSION_NUM | 8 |
| if EAC_FLAG == 1 | |
|     EAC_LENGTH_BYTE | 12 |
| else | |
|     EAC_COUNTER | 12 |
| end | |
| for i=1:NUM_AUX | |
|     AUX_PRIVATE_DYN | 48 |
| end | |
| CRC 32 | 32 |

FIG. 25
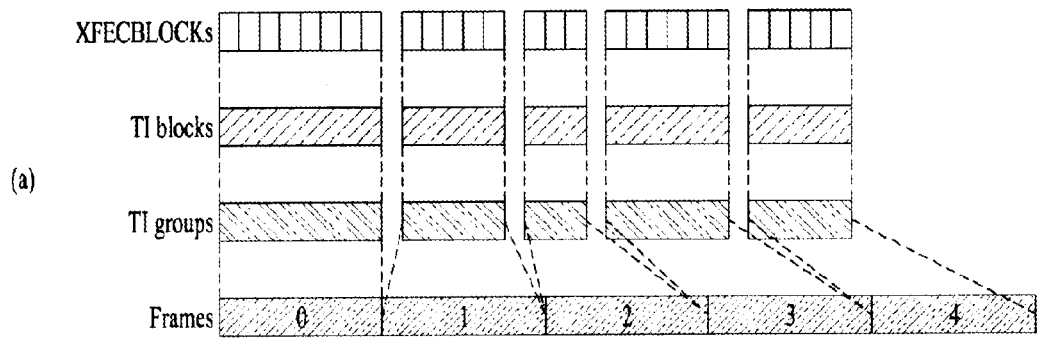
(a)
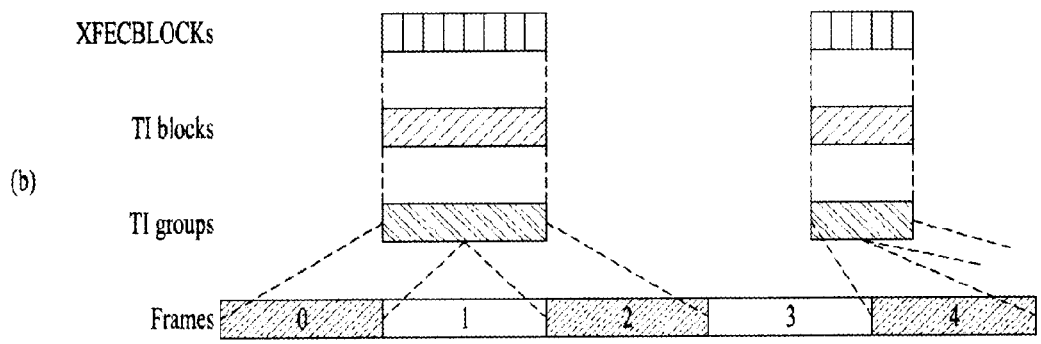
(b)
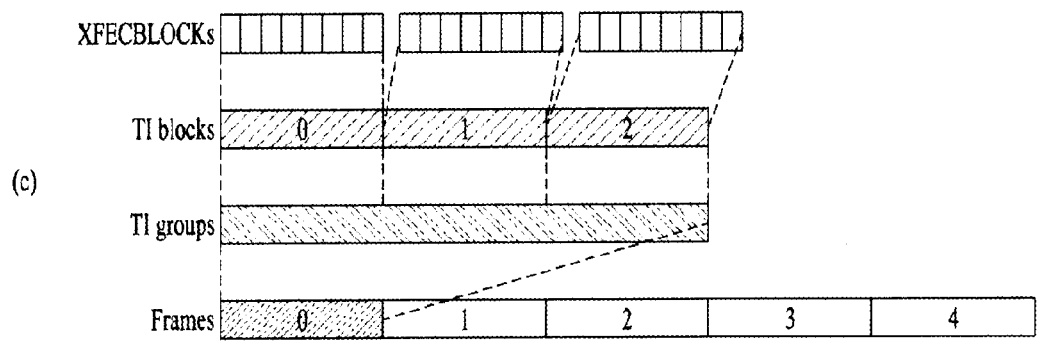
(c)

BER with 8bpcu channel NGHMIMO OD with Random BI/TI

BER with 8bpcu channel NGHMIMO OD HPI 9 with Random BI/TI

APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

This application claims the benefit of U.S. Provisional Patent Application Nos. 61/814,323 filed on Apr. 21, 2013, 61/841,412 filed on Jun. 30, 2013, 61/883,957 filed on Sep. 27, 2013 and 61/968,367 filed on Mar. 21, 2014 which is hereby incorporated by reference as if fully set forth herein.

BACKGROUND OF THE INVENTION

1. Field of the Invention

The present invention relates to an apparatus for transmitting broadcast signals, an apparatus for receiving broadcast signals and methods for transmitting and receiving broadcast signals.

2. Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

Accordingly, the present invention is directed to an apparatus for transmitting broadcast signals and an apparatus for receiving broadcast signals for future broadcast services and methods for transmitting and receiving broadcast signals for future broadcast services.

An object of the present invention is to provide an apparatus and method for transmitting broadcast signals to multiplex data of a broadcast transmission/reception system providing two or more different broadcast services in a time domain and transmit the multiplexed data through the same RF signal bandwidth and an apparatus and method for receiving broadcast signals corresponding thereto.

Another object of the present invention is to provide an apparatus for transmitting broadcast signals, an apparatus for receiving broadcast signals and methods for transmitting and receiving broadcast signals to classify data corresponding to services by components, transmit data corresponding to each component as a data pipe, receive and process the data Still another object of the present invention is to provide an apparatus for transmitting broadcast signals, an apparatus for receiving broadcast signals and methods for transmitting and receiving broadcast signals to signal signaling information necessary to provide broadcast signals.

To achieve the object and other advantages and in accordance with the purpose of the invention, as embodied and broadly described herein, the present invention provides a method of transmitting broadcast signals. The method of transmitting broadcast signals includes formatting input streams into Data Pipe, DP, data; Low-Density Parity-Check, LDPC, encoding the DP data according to a code rate; bit interleaving the LDPC encoded DP data; mapping the bit interleaved DP data onto constellations according to one of QAM (Quadrature Amplitude Modulation), NUQ (Non-Uniform QAM) or NUC (Non-Uniform Constellation); Multi-Input Multi-Output, MIMO, encoding the mapped DP data by using a MIMO encoding matrix having a MIMO encoding parameter; building at least one signal frame by mapping the MIMO encoded DP data; and modulating data in the built signal frame by an Orthogonal Frequency Division Multiplexing, OFDM, method and transmitting the broadcast signals having the modulated data.

Preferably, the MIMO encoding is performed according to either FR-SM (Full-rate spatial multiplexing) method or FRFD-SM (Full-rate Full-diversity spatial multiplexing) method.

Preferably, the QAM, the NUQ and the NUC are defined depending on the code rate.

Preferably, the MIMO encoding parameter is defined based on one of the QAM, the NUQ or the NUC.

In other aspect, the present invention provides a method of receiving broadcast signals. The method of receiving broadcast signals includes receiving the broadcast signals having at least one signal frame and demodulating data in the at least one signal frame by an Orthogonal Frequency Division Multiplexing, OFDM, method; parsing the at least one signal frame by de-mapping Data Pipe, DP, data; Multi-Input Multi-Output, MIMO, decoding the DP data by using a MIMO decoding matrix having a MIMO decoding parameter; de-mapping the MIMO decoded DP data from constellations according to one of QAM (Quadrature Amplitude Modulation), NUQ (Non-Uniform QAM) or NUC (Non-Uniform Constellation); bit de-interleaving the de-mapped DP data; Low-Density Parity-Check, LDPC, decoding the bit de-interleaved DP data according to a code rate; and de-formatting the LDPC decoded DP data into output streams.

Preferably, the MIMO decoding is performed according to either FR-SM (Full-rate spatial multiplexing) method or FRFD-SM (Full-rate Full-diversity spatial multiplexing) method.

Preferably, the QAM, the NUQ and the NUC are defined depending on the code rate.

Preferably, the MIMO decoding parameter is defined based on one of the QAM, the NUQ or the NUC.

In another aspect, the present invention provides an apparatus for transmitting broadcast signals. The apparatus for transmitting broadcast signals includes a formatting module configured to format input streams into Data Pipe, DP, data; a Low-Density Parity-Check, LDPC, encoding module configured to LDPC encode the DP data according to a code rate; a bit interleaving module configured to bit interleave the LDPC encoded DP data; a mapping module configured to map the bit interleaved DP data onto constellations according to one of QAM (Quadrature Amplitude Modulation), NUQ (Non-Uniform QAM) or NUC (Non-Uniform Constellation); a Multi-Input Multi-Output, MIMO, encoding module configured to MIMO encode the mapped DP data by using a MIMO encoding matrix having a MIMO encoding parameter; a frame building module configured to build at least one signal frame by mapping the MIMO encoded DP data; a modulating module configured to modulate data in the built signal frame by an Orthogonal Frequency Division Multiplexing, OFDM, method; and a transmitting module configured to transmit the broadcast signals having the modulated data.

Preferably, the MIMO encoding module performs MIMO encoding according to either FR-SM (Full-rate spatial multiplexing) method or FRFD-SM (Full-rate Full-diversity spatial multiplexing) method.

Preferably, the QAM, the NUQ and the NUC are defined depending on the code rate.

Preferably, the MIMO encoding parameter is defined based on one of the QAM, the NUQ or the NUC.

In another aspect, the present invention provides an apparatus for receiving broadcast signals. The apparatus for receiving broadcast signals includes a receiving module configured to receive the broadcast signals having at least one signal frame; a demodulating module configured to demodulate data in the at least one signal frame by an Orthogonal Frequency Division Multiplexing, OFDM, method; a parsing module configured to parse the at least one signal frame by de-mapping Data Pipe, DP, data; a Multi-Input Multi-Output, MIMO, decoding module configured to MIMO decode the DP data by using a MIMO decoding matrix having a MIMO decoding parameter; a de-mapping module configured to de-map the MIMO decoded DP data from constellations according to one of QAM (Quadrature Amplitude Modulation), NUQ (Non-Uniform QAM) or NUC (Non-Uniform Constellation); a bit de-interleaving module configured to bit de-interleave the de-mapped DP data; a Low-Density Parity-Check, LDPC, decoding module configured to LDPC decode the bit de-interleaved DP data according to a code rate; and a de-formatting module configured to de-format the LDPC decoded DP data into output streams.

Preferably, the MIMO decoding module performs MIMO decoding according to either FR-SM (Full-rate spatial multiplexing) method or FRFD-SM (Full-rate Full-diversity spatial multiplexing) method.

Preferably, the QAM, the NUQ and the NUC are defined depending on the code rate.

Preferably, the MIMO decoding parameter is defined based on one of the QAM, the NUQ or the NUC.

The present invention can process data according to service characteristics to control QoS (Quality of Services) for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MEMO system.

According to the present invention, it is possible to provide broadcast signal transmission and reception methods and apparatus capable of receiving digital broadcast signals without error even with mobile reception equipment or in an indoor environment.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 13 illustrates PLS1 data according to an embodiment of the present invention.

FIG. 14 illustrates PLS2 data according to an embodiment of the present invention.

FIG. 25 illustrates a time interleaving according to an embodiment of the present invention.

DETAILED DESCRIPTION OF THE INVENTION

Figure 1:
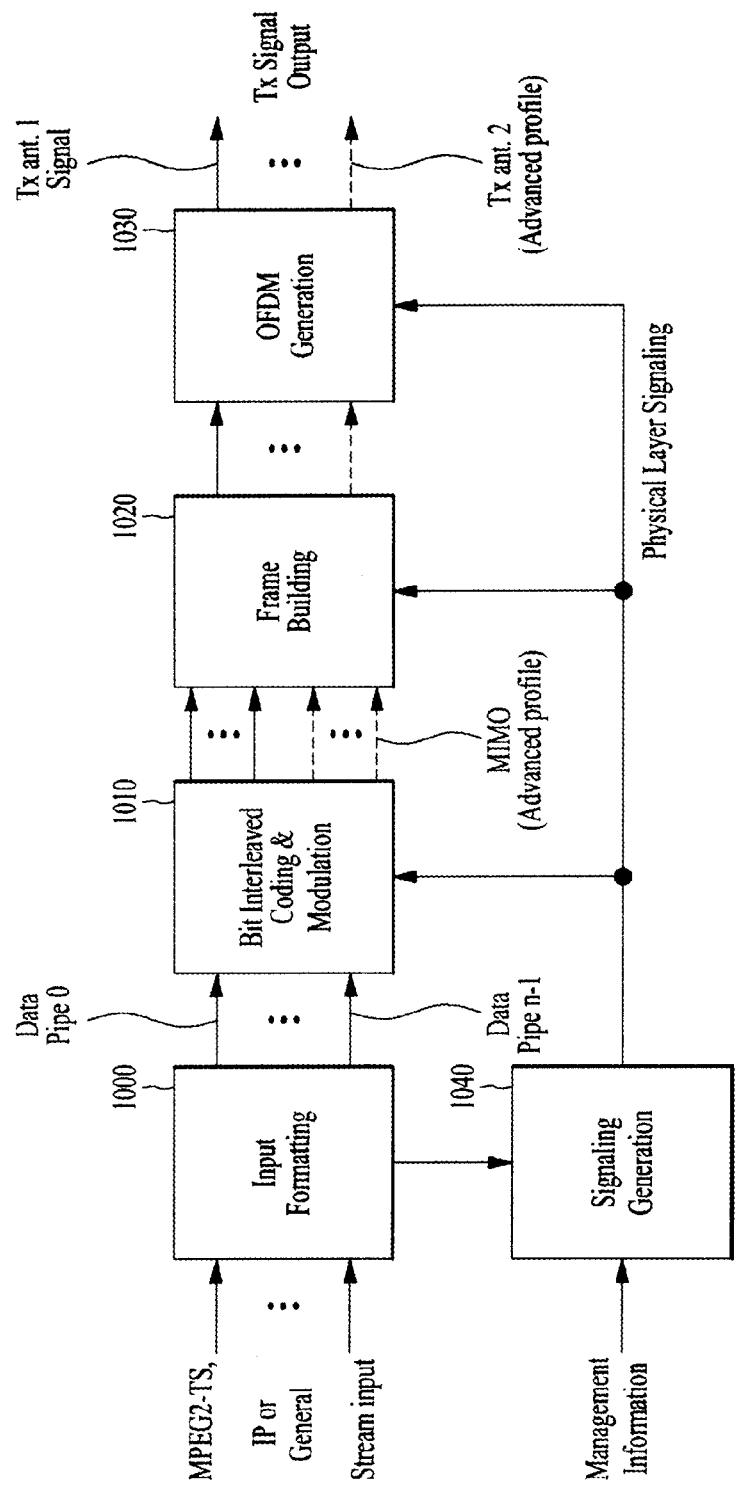
FIG. 1 illustrates a structure of an apparatus for transmitting broadcast signals for future broadcast services according to an embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | ≤$2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | ≤$2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | ≤$2^{19}$ data cells |
| Pilot patterns | Pilot pattern for fixed reception |
| FFT size | 16K, 32K points |

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
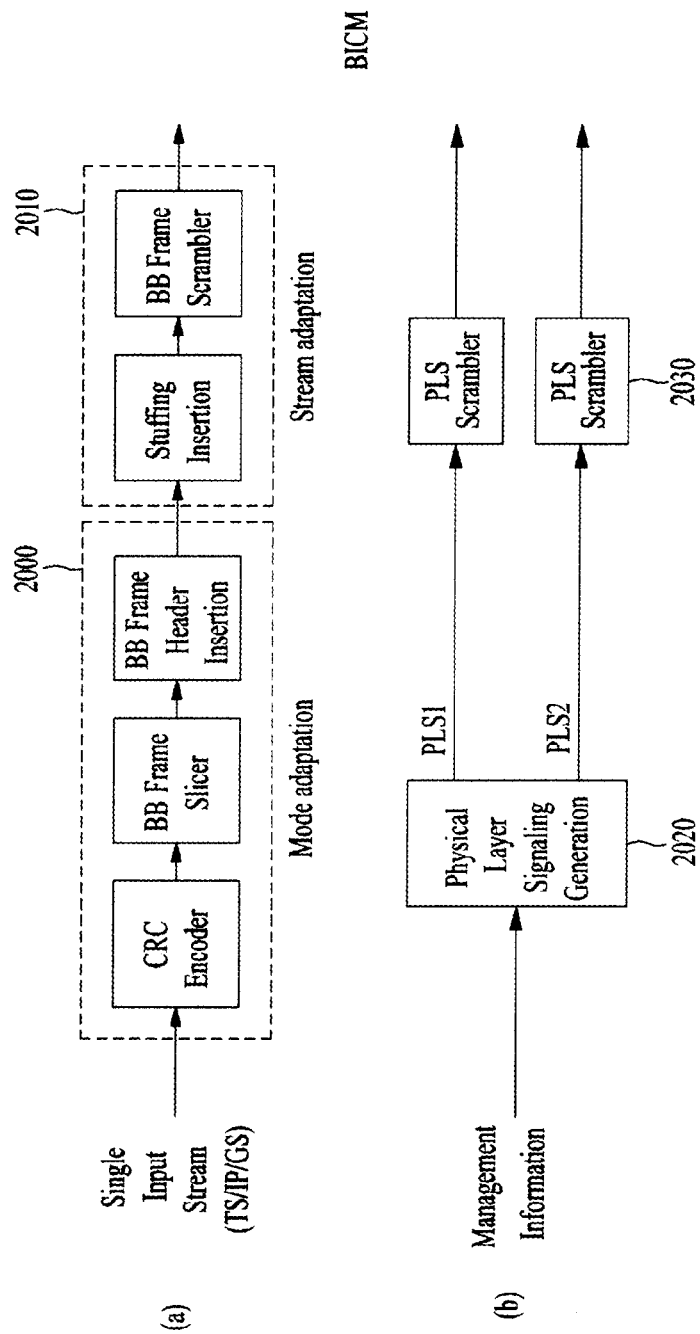
FIG. 2 illustrates an input formatting block according to one embodiment of the present invention.
Figure 3:
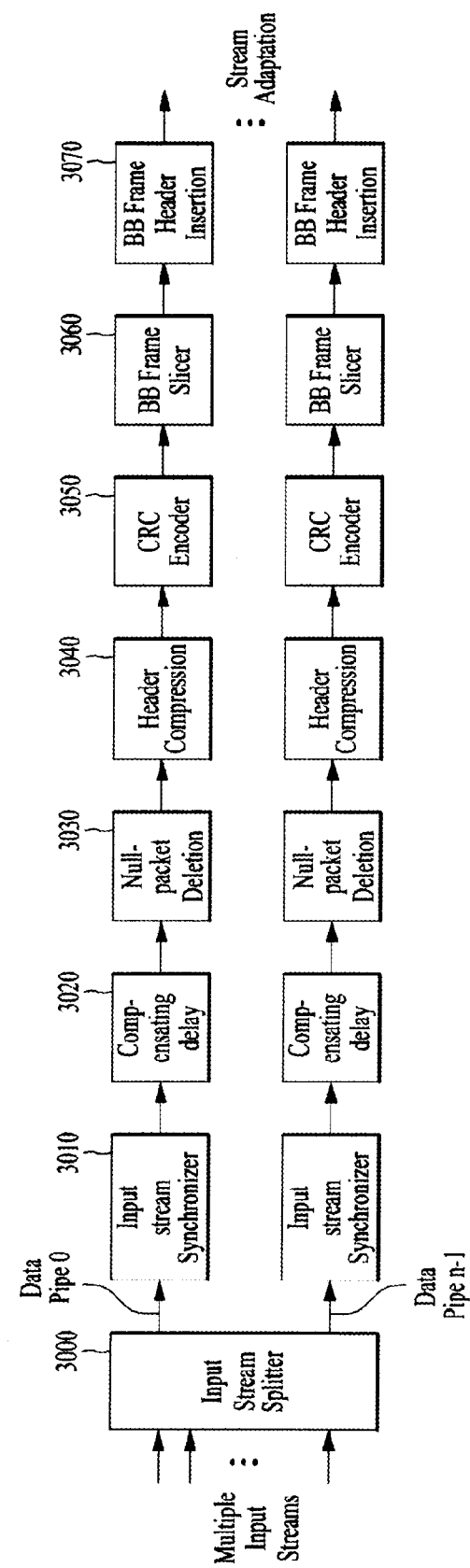
FIG. 3 illustrates an input formatting block according to another embodiment of the present invention.
Figure 4:
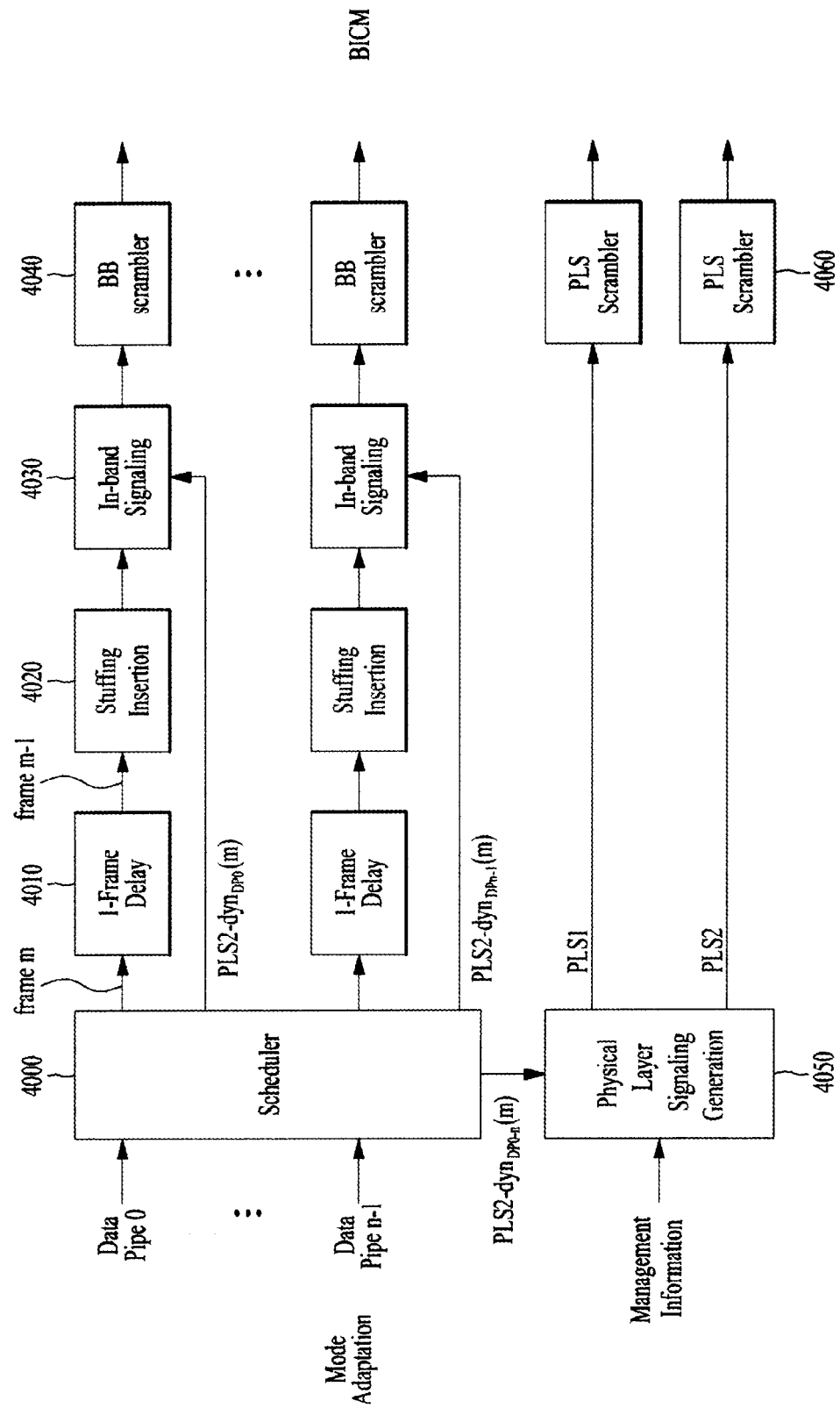
FIG. 4 illustrates an input formatting block according to another embodiment of the present invention.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feed-back shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FECBLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

Figure 5:
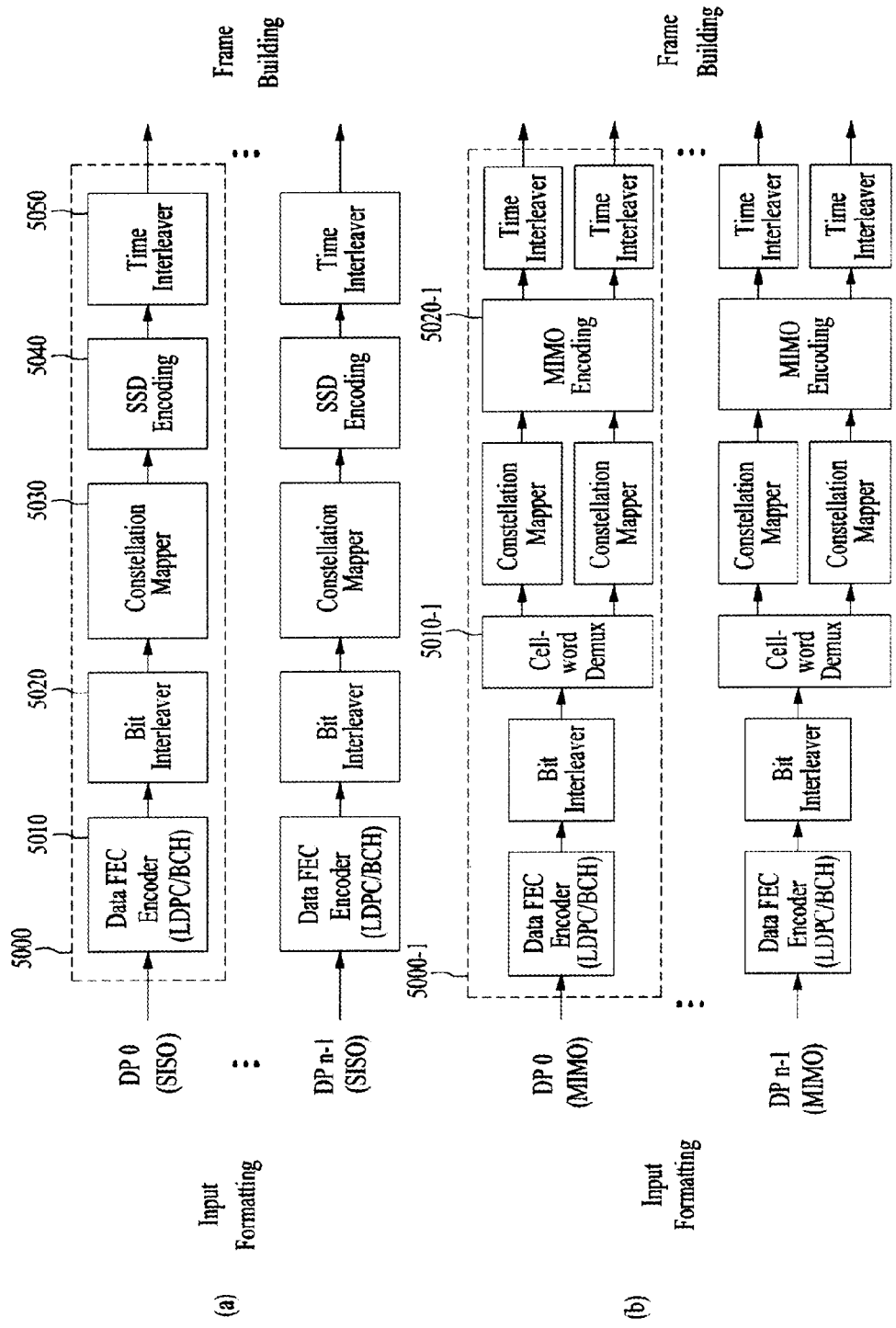
FIG. 5 illustrates a BICM block according to an embodiment of the present invention.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, $e_1$. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ ($e_{1,i}$ and $e_{2,i}$) are fed to the input of the MIMO Encoder. Paired MIMO Encoder output (g1,i and g2,i) is transmitted by the same carrier k and OFDM symbol l of their respective TX antennas.

The above-described blocks may be omitted or replaced by blocks having similar or identical functions.

Figure 6:
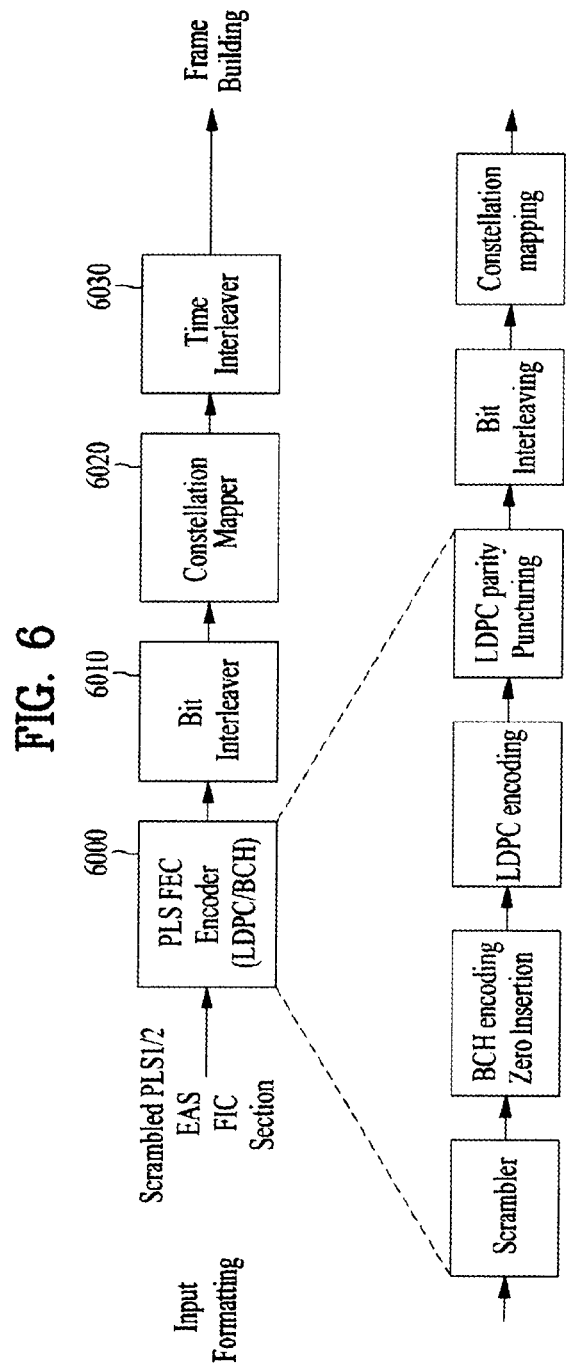
FIG. 6 illustrates a BICM block according to another embodiment of the present invention.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010, a constellation mapper 6020 and time interleaver 6030.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permitted before LDPC encoding.

The LDPC encoding block can encode the output of the BCH encoding/zero insertion block using LDPC code. To generate a complete coded block, $C_{ldpc}$, parity bits, $P_{ldpc}$ are encoded systematically from each zero-inserted PLS information block, $I_{ldpc}$ and appended after it.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Expression 1]

The LDPC code parameters for PLS1 and PLS2 are as following table 4.

TABLE 4

| Signaling Type | $K_{sig}$ | $K_{bch}$ | $N_{bch\_parity}$ | $K_{ldpc}$ $(=N_{bch})$ | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The time interleaver 6030 can interleave the mapped PLS1 data and PLS2 data.

The above-described blocks may be omitted or replaced by blocks having similar or identical functions.

Figure 7:
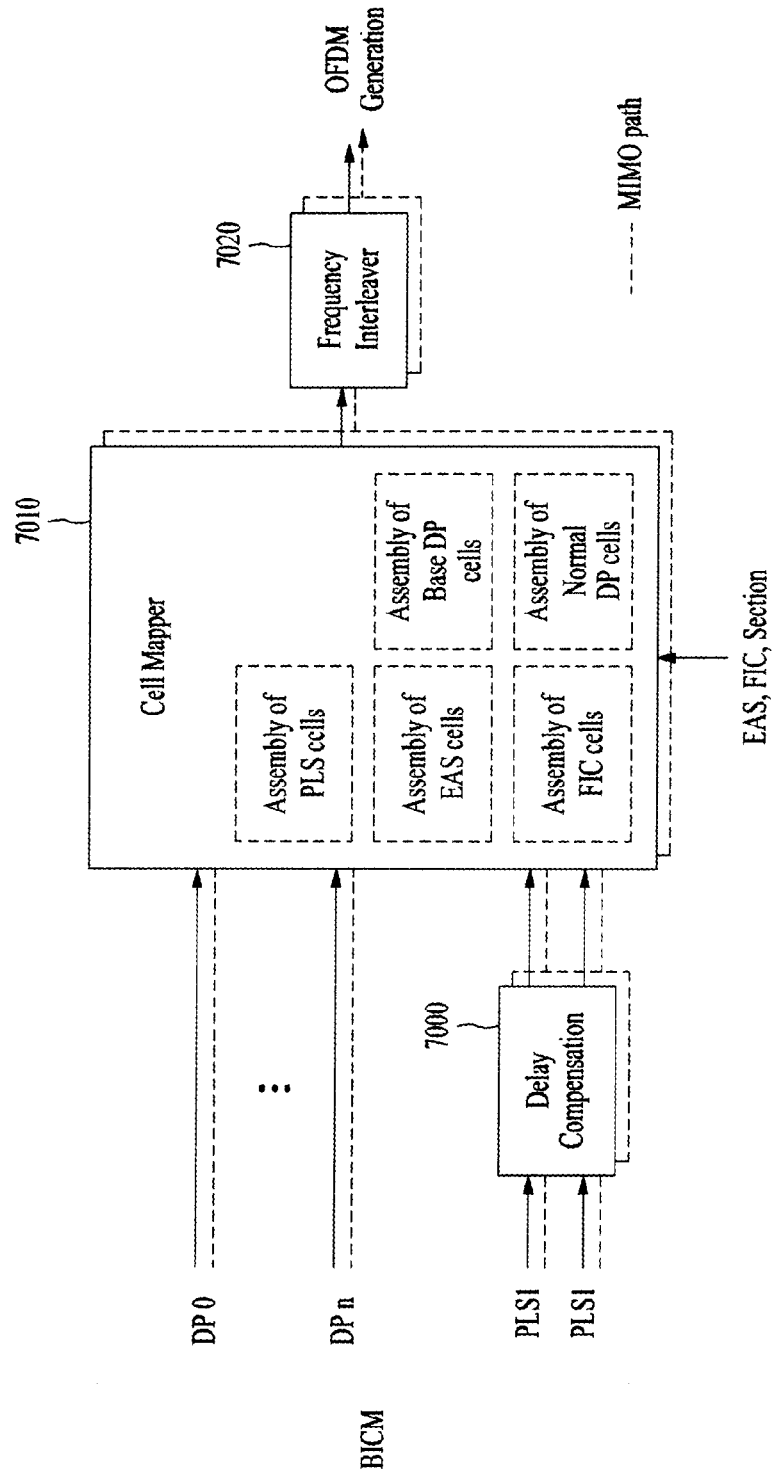
FIG. 7 illustrates a frame building block according to one embodiment of the present invention.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame. Details of operations of the frequency interleaver 7020 will be described later.

The above-described blocks may be omitted or replaced by blocks having similar or identical functions.

Figure 8:
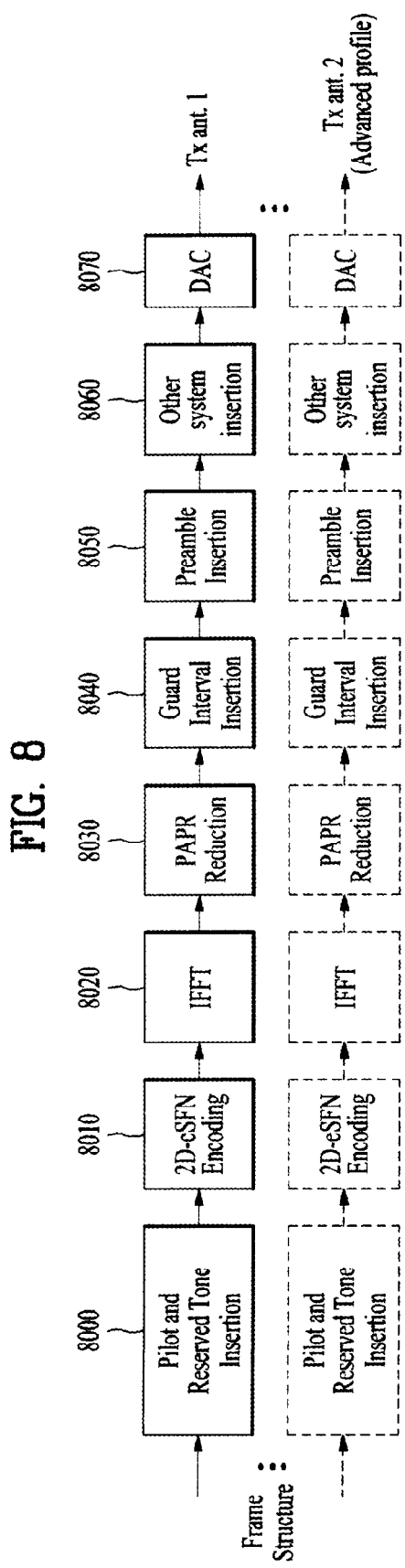
FIG. 8 illustrates an OFMD generation block according to an embodiment of the present invention.

FIG. 8 illustrates an OFMD generation block according to an embodiment of the present invention.

The OFMD generation block illustrated in FIG. 8 corresponds to an embodiment of the OFMD generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

Figure 9:
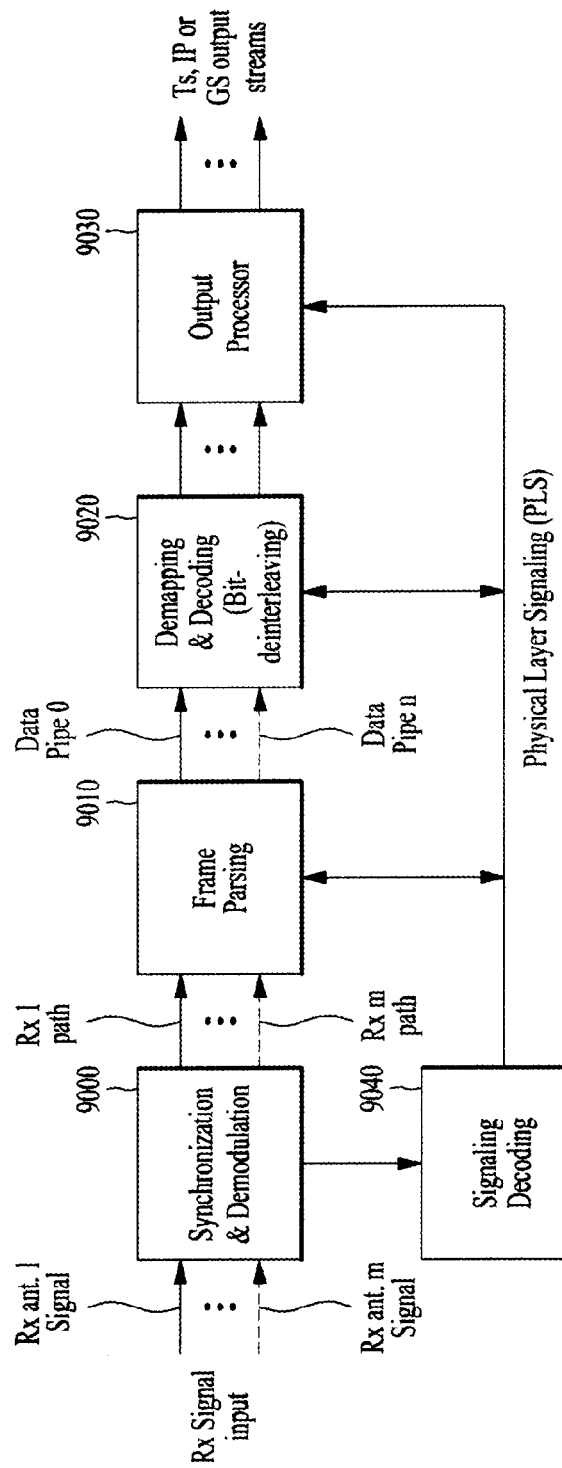
FIG. 9 illustrates a structure of an apparatus for receiving broadcast signals for future broadcast services according to an embodiment of the present invention.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9100 can parse input signal frames and extract data through which a service selected by a user is transmitted. If the apparatus for transmitting broadcast signals performs interleaving, the frame parsing module 9100 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9200 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9200 can obtain transmission parameters necessary for demapping and decoding by decoding the data output from the signaling decoding module 9400.

The output processor 9300 can perform reverse procedures of various compression/signal processing procedures which are applied by the apparatus for transmitting broadcast signals to improve transmission efficiency. In this case, the output processor 9300 can acquire necessary control information from data output from the signaling decoding module 9400. The output of the output processor 8300 corresponds to a signal input to the apparatus for transmitting broadcast signals and may be MPEG-TSs, IP streams (v4 or v6) and generic streams.

The signaling decoding module 9400 can obtain PLS information from the signal demodulated by the synchronization & demodulation module 9000. As described above, the frame parsing module 9100, demapping & decoding module 9200 and output processor 9300 can execute functions thereof using the data output from the signaling decoding module 9400.

Figure 10:
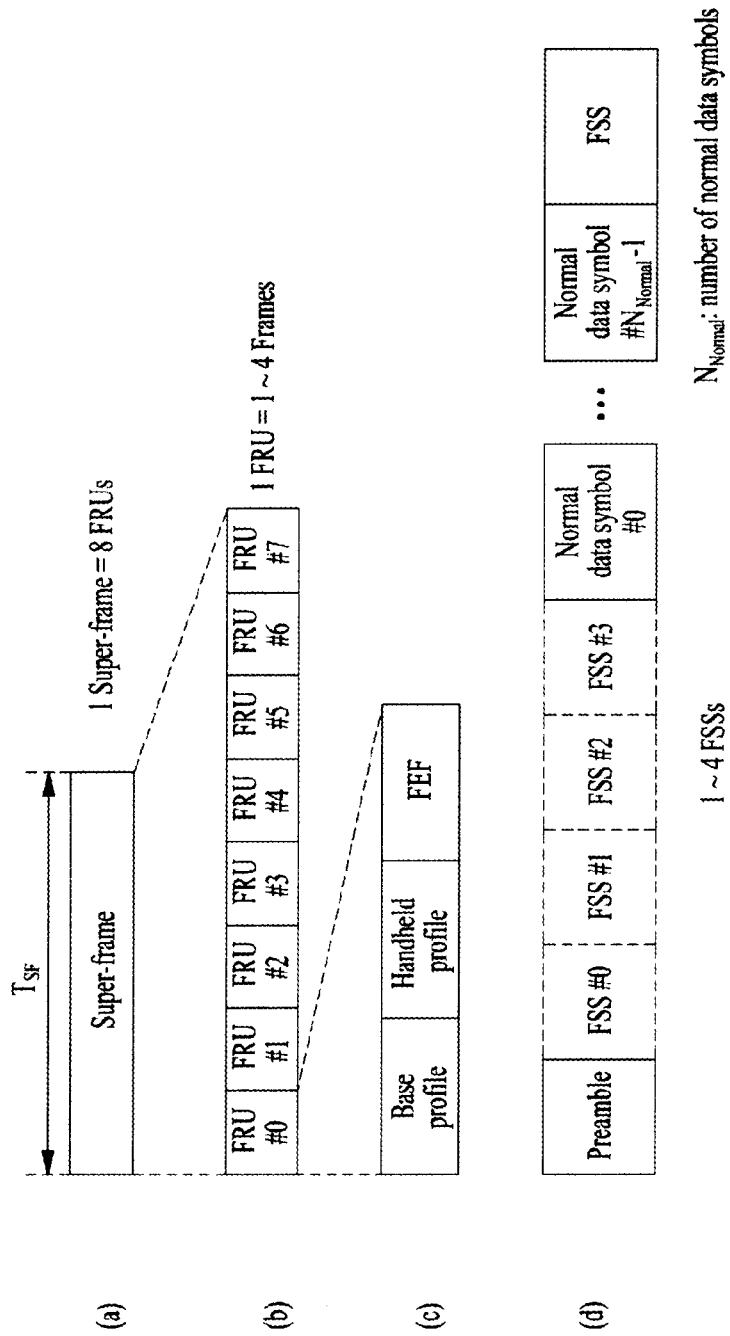
FIG. 10 illustrates a frame structure according to an embodiment of the present invention.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced).

PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

Figures 11, 12:
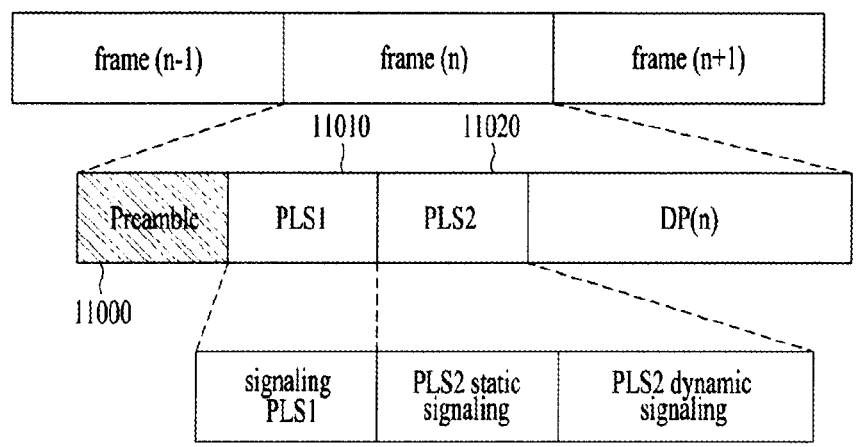
FIG. 11 illustrates a signaling hierarchy structure of the frame according to an embodiment of the present invention.
FIG. 12 illustrates preamble signaling data according to an embodiment of the present invention.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |
| 010 | Advanced profiled |
| 011~110 | Reserved |

TABLE 5-continued

| Value | PHY profile |
|---|---|
| 111 | FEF |

FFT_SIZE: This 2 bit field indicates the FFT size of the current frame within a frame-group, as described in below table 6.

TABLE 6

| Value | FFT size |
|---|---|
| 00 | 8 K FFT |
| 01 | 16 K FFT |
| 10 | 32 K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |

TABLE 8-continued

| | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: this 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the $(i+1)^{th}$ (i is the loop index) frame of the associated FRU. This field uses the same signaling format as shown in the table 8.

FRU_FRAME_LENGTH: This 2-bit field indicates the length of the $(i+1)^{th}$ frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the $(i+1)^{th}$ frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
|---|---|
| 00 | 4 K-1/4 and 7 K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
|---|---|
| 000 | BPSK |
| 001 | QPSK |
| 010 | QAM-16 |
| 011 | NUQ-64 |
| 100~111 | Reserved |

PLS2_SIZE_CELL: This 15-bit field indicates $C_{total\_partial\_block}$, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates $C_{total\_partial\_block}$, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates $C_{total\_full\_block}$. The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
|---|---|
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
|---|---|
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
|---|---|
| 00 | 16 K LDPC |
| 01 | 64 K LDPC |
| 10~11 | Reserved |

DP_COD: This 4-bit field indicates the code rate used by the associated DP. The code rate is signaled according to the below table 15.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
|---|---|
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates $P_I$, the number of the frames to which each TI group is mapped, and there is one TI-block per TI group ($N_{TI}=1$). The allowed $P_I$ values with 2-bit field are defined in the below table 18.

If the DP_TI_TYPE is set to the value '0', this field indicates the number of TI-blocks $N_{TI}$ per TI group, and there is one TI group per frame ($P_I=1$). The allowed $P_I$ values with 2-bit field are defined in the below table 18.

TABLE 18

| 2-bit field | $P_I$ | $N_{TI}$ |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates the frame interval ($I_{JUMP}$) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| ValuePayload | Type |
|---|---|
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

Figures 15, 16:
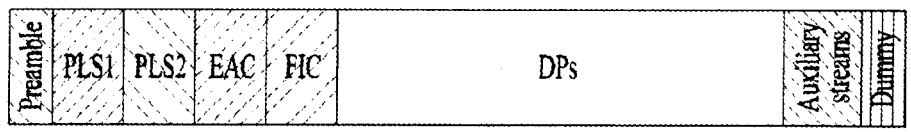
FIG. 15 illustrates PLS2 data according to another embodiment of the present invention.
FIG. 16 illustrates a logical structure of a frame according to an embodiment of the present invention.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| PHY profile | DP_START field size | |
|---|---|---|
| | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 17:
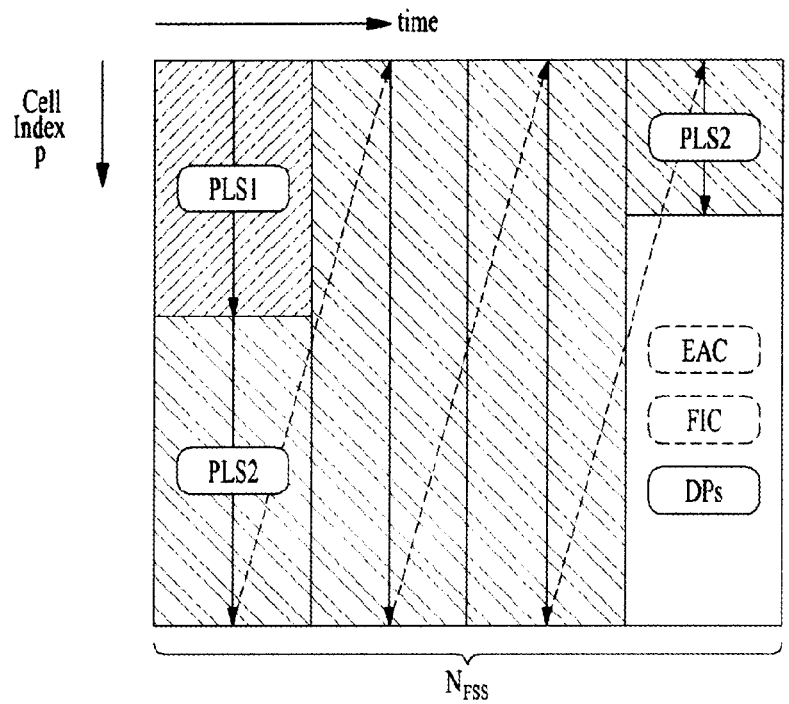
FIG. 17 illustrates PLS mapping according to an embodiment of the present invention.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) $N_{FSS}$ is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the $N_{FSS}$ FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 18:
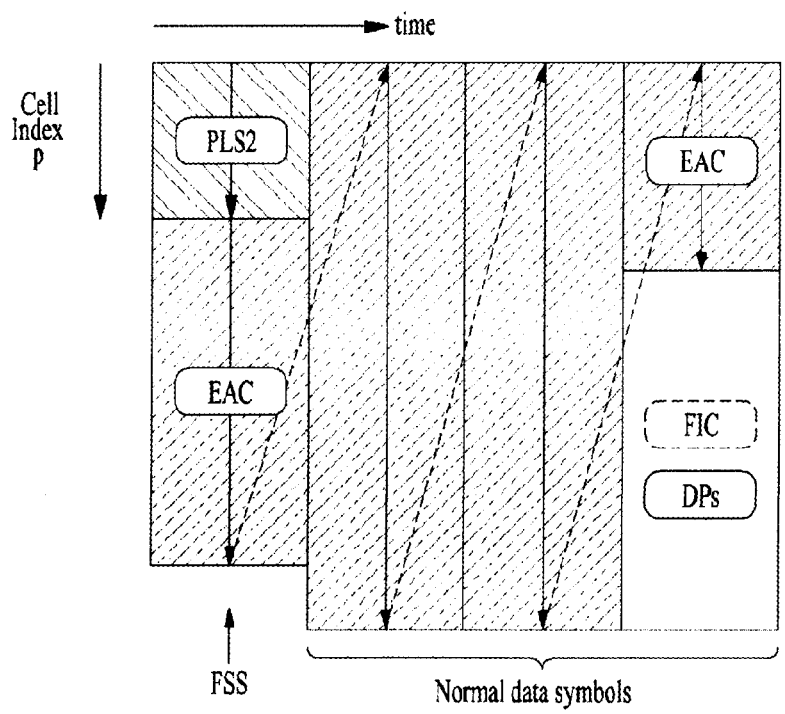
FIG. 18 illustrates EAC mapping according to an embodiment of the present invention.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

Figure 19:
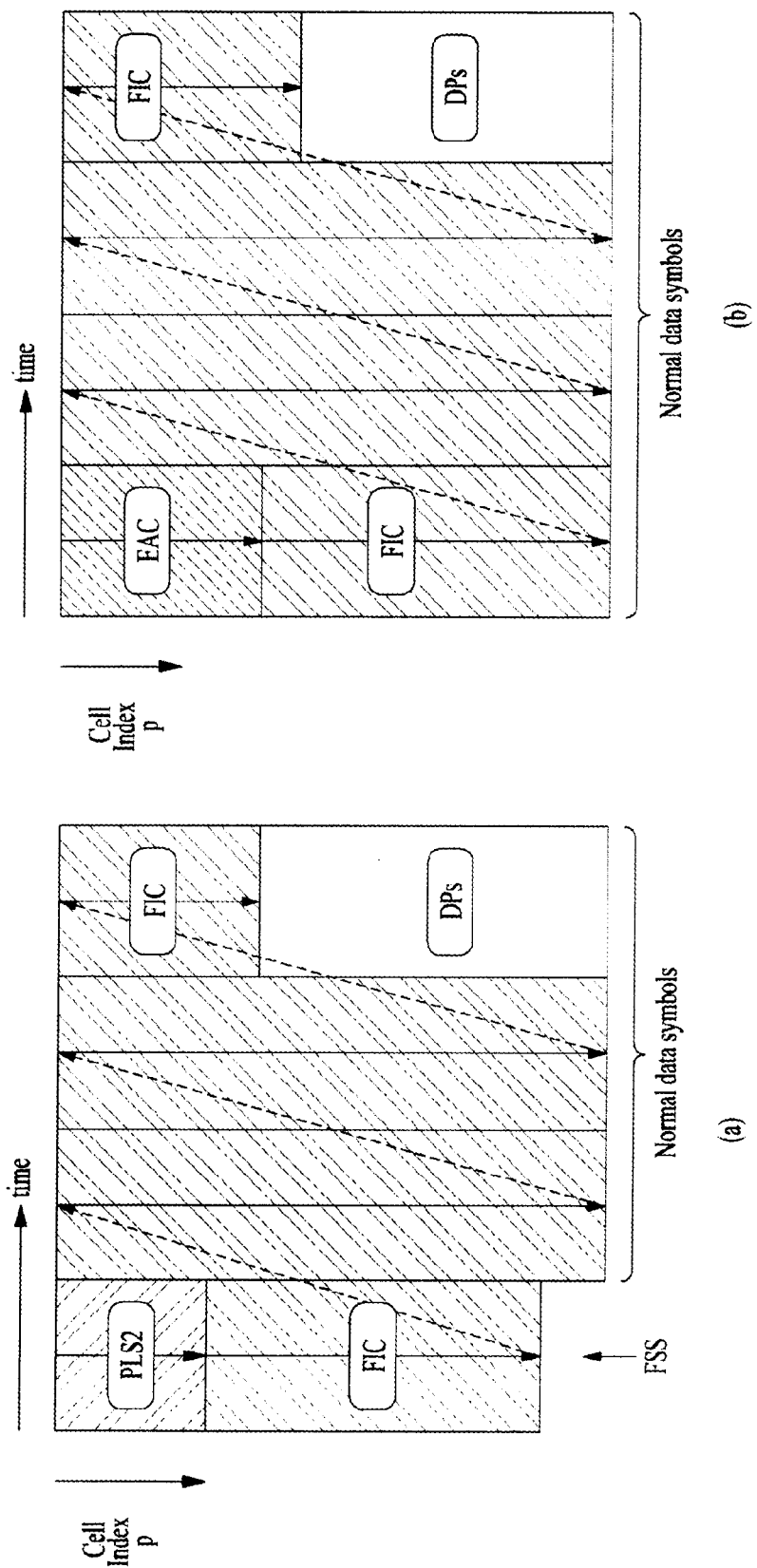
FIG. 19 illustrates FIC mapping according to an embodiment of the present invention.

FIG. 19 illustrates FIC mapping according to an embodiment of the present invention.

(a) shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 20:
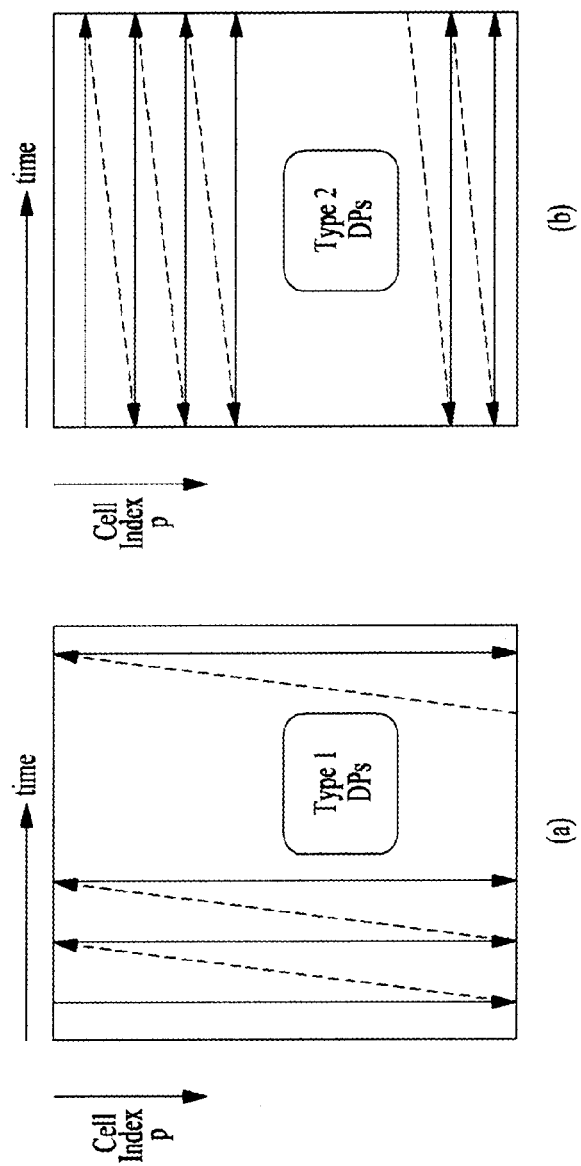
FIG. 20 illustrates a type of DP according to an embodiment of the present invention.

FIG. 20 illustrates a type of DP according to an embodiment of the present invention.

(a) shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM
Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

$$D_{DP1} + D_{DP2} \leq D_{DP} \quad \text{[Math figure 2]}$$

where $D_{DP1}$ is the number of OFDM cells occupied by Type 1 DPs, $D_{DP2}$ is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

Figure 21:
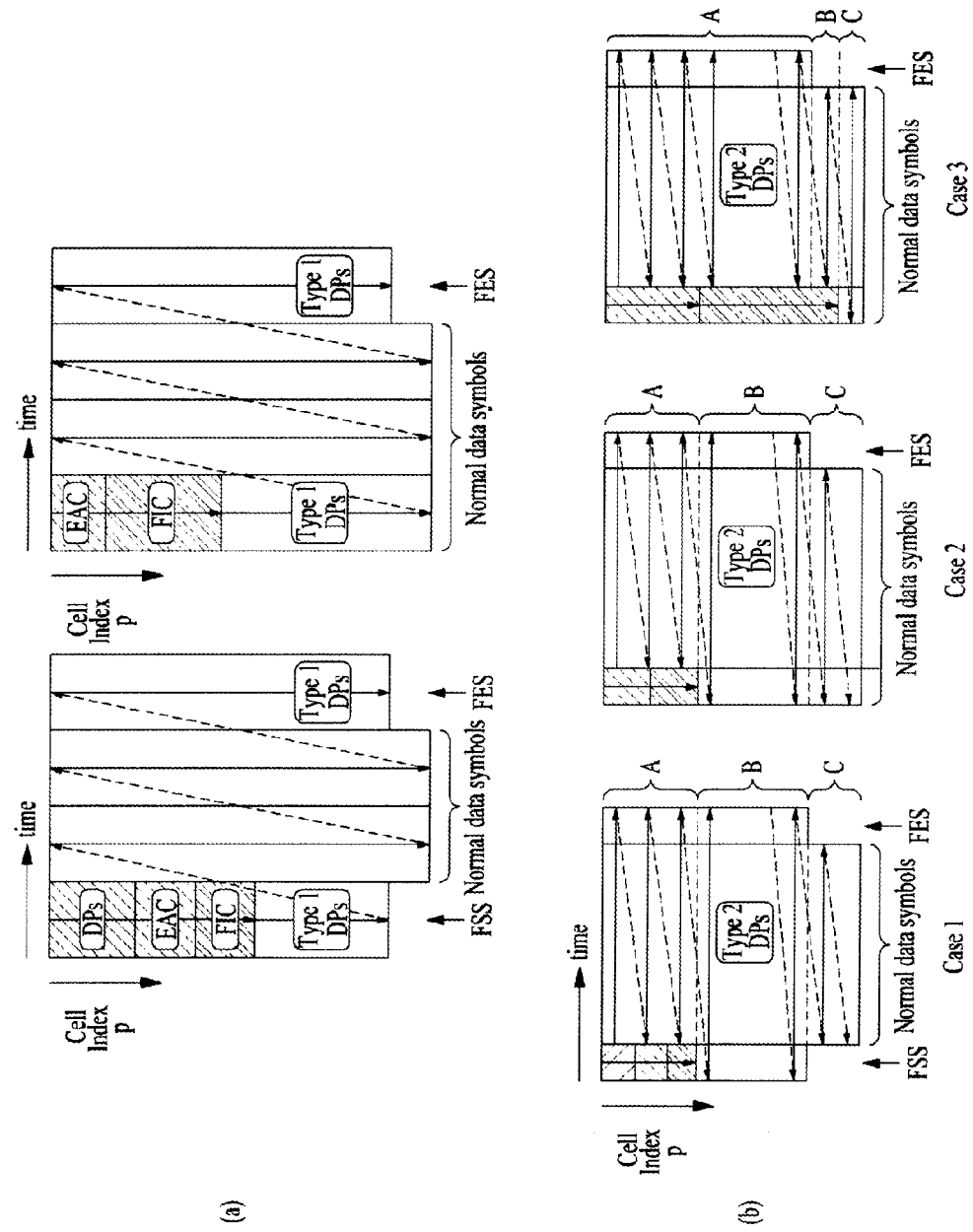
FIG. 21 illustrates DP mapping according to an embodiment of the present invention.

FIG. 21 illustrates DP mapping according to an embodiment of the present invention.

(a) shows an addressing of OFDM cells for mapping type 1 DPs and (b) shows an addressing of OFDM cells for mapping for type 2 DPs.

Addressing of OFDM cells for mapping Type 1 DPs $(0, \ldots, D_{DP1}-1)$ is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs $(0, \ldots, D_{DP2}-1)$ is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than $C_{FSS}$. The third case, shown on the right side in (b), is the same as the second case except that the number of FIC cells mapped on that symbol exceeds $C_{FSS}$.

The extension to the case where Type 1 DP(s) precede Type 2 DP(s) is straightforward since PLS, EAC and FIC follow the same "Type 1 mapping rule" as the Type 1 DP(s).

Figure 22:
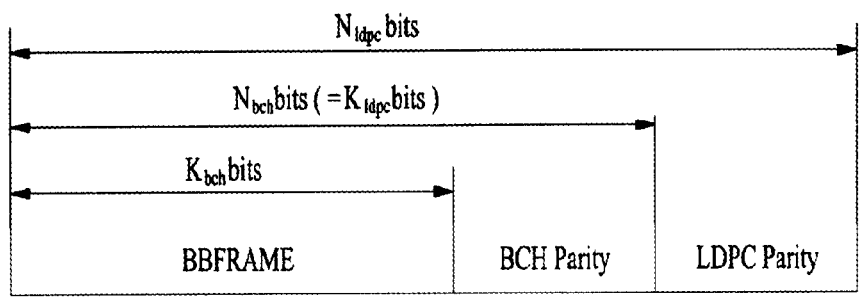
FIG. 22 illustrates an FEC structure according to an embodiment of the present invention.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF ($K_{bch}$ bits), and then LDPC encoding is applied to BCH-encoded BBF ($K_{ldpc}$ bits=$N_{bch}$ bits) as illustrated in FIG. 22.

The value of $N_{ldpc}$ is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch}$-$K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | $N_{ldpc}$ | $K_{ldpc}$ | $K_{bch}$ | BCH error correction capability | $N_{bch}$-$K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed $B_{ldpc}$ (FECBLOCK), $P_{ldpc}$ (parity bits) is encoded systematically from each $I_{ldpc}$ (BCH-encoded BBF), and appended to $I_{ldpc}$. The completed $B_{ldpc}$ (FECBLOCK) are expressed as follow Math figure.

$$B_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Math figure 3]

The parameters for long FECBLOCK and short FECBLOCK are given in the above table 28 and 29, respectively.

The detailed procedure to calculate $N_{ldpc} - K_{ldpc}$ parity bits for long FECBLOCK, is as follows:

1) Initialize the parity bits, $$p_0 = p_1 = p_2 = \ldots = p_{N_{ldpc}-K_{ldpc}-1} = 0$$ [Math figure 4]

2) Accumulate the first information bit—$i_0$, at parity bit addresses specified in the first row of an addresses of parity check matrix. The details of addresses of parity check matrix will be described later. For example, for rate 13/15:

$p_{983} = p_{983} \oplus i_0 p_{2815} = p_{2815} \oplus i_0$ $p_{4837} = p_{4837} \oplus i_0 p_{4989} = p_{4989} \oplus i_0$ $p_{6138} = p_{6138} \oplus i_0 p_{6458} = p_{6458} \oplus i_0$ $p_{6921} = p_{6921} \oplus i_0 p_{6974} = p_{6974} \oplus i_0$ $p_{7572} = p_{7572} \oplus i_0 p_{8260} = p_{8260} \oplus i_0$ $p_{8496} = p_{8496} \oplus i_0$ [Math figure 5]

3) For the next 359 information bits, $i_s$, $s=1, 2, \ldots, 359$ accumulate $i_s$ at parity bit addresses using following Math figure.

$$\{x + (s \bmod 360) \times Q_{ldpc}\} \bmod (N_{ldpc} - K_{ldpc})$$ [Math figure 6]

where x denotes the address of the parity bit accumulator corresponding to the first bit $i_0$, and $Q_{ldpc}$ is a code rate dependent constant specified in the addresses of parity check matrix. Continuing with the example, $Q_{ldpc}=24$ for rate 13/15, so for information bit $i_1$, the following operations are performed:

$p_{1007} = p_{1007} \oplus i_1 p_{2839} = p_{2839} \oplus i_1$ $p_{4861} = p_{4861} \oplus i_1 p_{5013} = p_{5013} \oplus i_1$ $p_{6162} = p_{6162} \oplus i_1 p_{6482} = p_{6482} \oplus i_1$ $p_{6945} = p_{6945} \oplus i_1 p_{6998} = p_{6998} \oplus i_1$ $p_{7596} = p_{7596} \oplus i_1 p_{8284} = p_{8284} \oplus i_1$ $p_{8520} = p_{8520} \oplus i_1$ [Math figure 7]

4) For the 361$^{st}$ information bit $i_{360}$, the addresses of the parity bit accumulators are given in the second row of the addresses of parity check matrix. In a similar manner the addresses of the parity bit accumulators for the following 359 information bits $i_s$, s=361, 362, …, 719 are obtained using the Math FIG. 6, where x denotes the address of the parity bit accumulator corresponding to the information bit $i_{360}$, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i = p_i \oplus p_{i-1}, i=1, 2, \ldots, N_{ldpc} - K_{ldpc} - 1$$ [Math figure 8]

where final content of $p_i$, i=0, 1, … $N_{ldpc} - K_{ldpc} - 1$ is equal to the parity bit $p_i$.

TABLE 30

| Code Rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

Figure 23:
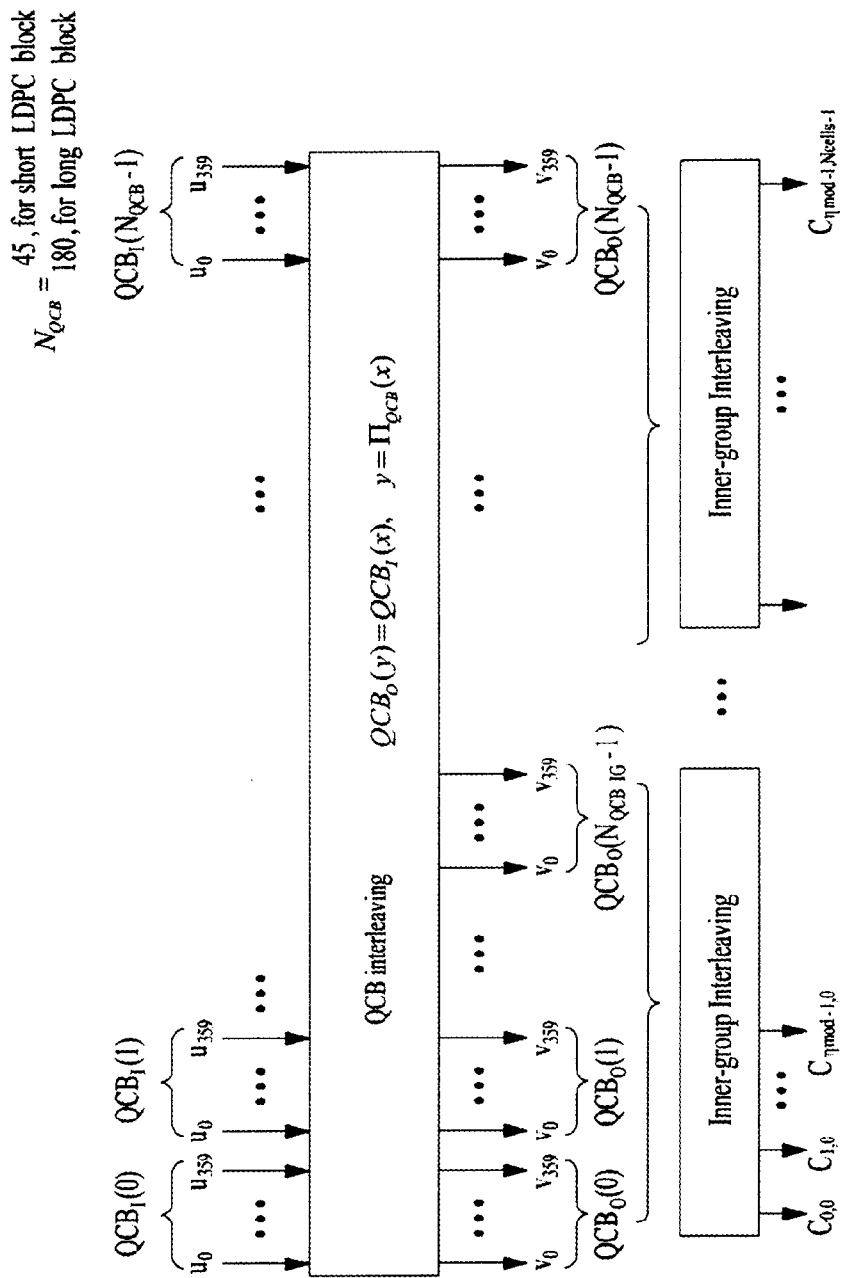
FIG. 23 illustrates a bit interleaving according to an embodiment of the present invention.

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving. (a) shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where $N_{cells}=64800/\eta_{mod}$ or $16200/\eta_{mod}$ according to the FECBLOCK length. The QCB interleaving pattern is unique to each combination of modulation type and LDPC code rate.

After QCB interleaving, inner-group interleaving is performed according to modulation type and order ($\eta_{mod}$) which is defined in the below table 32. The number of QC blocks for one inner-group, $N_{QCB\_IG}$, is also defined.

TABLE 32

| Modulation type | $\eta_{mod}$ | $N_{QCB\_IG}$ |
| --- | --- | --- |
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |
| NUQ-1024 | 10 | 5 |
| NUC-1024 | 10 | 10 |

The inner-group interleaving process is performed with $N_{QCB\_IG}$ QC blocks of the QCB interleaving output. Inner-group interleaving has a process of writing and reading the bits of the inner-group using 360 columns and $N_{QCB\_IG}$ rows. In the write operation, the bits from the QCB interleaving output are written row-wise. The read operation is performed column-wise to read out m bits from each row, where m is equal to 1 for NUC and 2 for NUQ.

Figure 24:
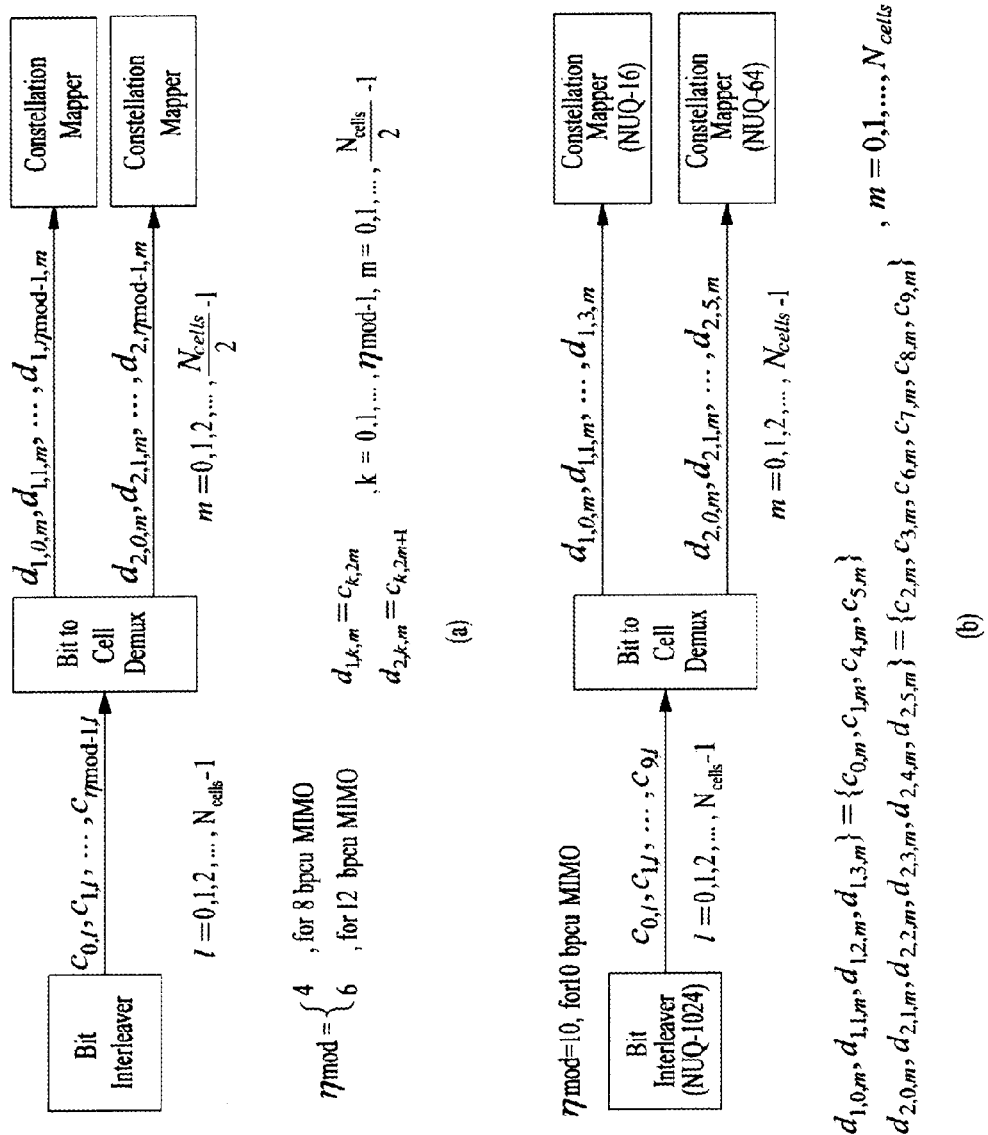
FIG. 24 illustrates a cell-word demultiplexing according to an embodiment of the present invention.

FIG. 24 illustrates a cell-word demultiplexing according to an embodiment of the present invention.

(a) shows a cell-word demultiplexing for 8 and 12 bpcu MIMO and (b) shows a cell-word demultiplexing for 10 bpcu MIMO.

Each cell word ($c_{0,l}, c_{1,l}, \ldots, c_{\eta\ mod-1,l}$) of the bit interleaving output is demultiplexed into ($d_{1,0,m}, d_{1,1,m} \ldots, d_{1,\eta\ mod-1,m}$) and ($d_{2,0,m}, d_{2,1,m} \ldots, d_{2,\eta\ mod-1,m}$), as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word ($c_{0,1}, c_{1,l}, \ldots, c_{9,l}$) of the Bit Interleaver output is demultiplexed into ($d_{1,0,m}, d_{1,1,m} \ldots, d_{1,3,m}$) and ($d_{2,0,m}, d_{2,1,m} \ldots d_{2,5,m}$), as shown in (b).

FIG. 25 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks $N_{TI}$ per TI group. For DP_TI_TYPE=1', this parameter is the number of frames $P_I$ spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames $I_{JUMP}$ between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by $N_{xBLOCK\_Group(n)}$ and is signaled as DP_NUM_BLOCK in the PLS2-DYN data. Note that $N_{xBLOCK\_Group(n)}$ may vary from the minimum value of 0 to the maximum value $N_{xBLOCK\_Group\_MAX}$ (corresponding to DP_NUM_BLOCK_MAX) of which the largest value is 1023.

Each TI group is either mapped directly onto one frame or spread over $P_I$ frames. Each TI group is also divided into more than one TI blocks ($N_{TI}$), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Modes | Descriptions |
| --- | --- |
| Option-1 | Each TI group contains one TI block and is mapped directly to one frame as shown in (a). This option is signaled in the PLS2-STAT by DP_TI_TYPE = '0' and DP_TI_LENGTH = '1'($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = $N_{TI}$, while $P_I$ = 1. |

Figure 26:
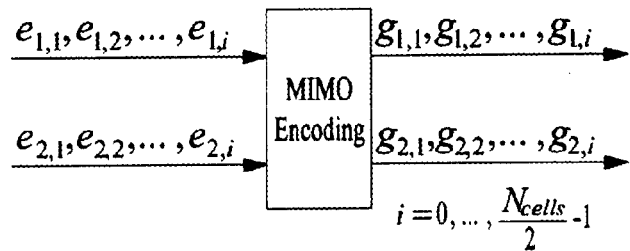
FIG. 26 illustrates a MIMO encoding block diagram according to an embodiment of the present invention.

FIG. 26 illustrates a MIMO encoding block diagram according to an embodiment of the present invention.

The MIMO encoding scheme according to an embodiment of the present invention is optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics can make it difficult to get capacity gain from MIMO. The MIMO encoding scheme according to an embodiment of the present invention overcomes this problem using a rotation-based pre-coding and phase randomization of one of the MIMO output signals. MIMO encoding can be intended for a 2×2 MIMO system requiring at least two antennas at both the transmitter and the receiver.

MIMO processing can be required for the advanced profile frame, which means all DPs in the advanced profile frame are processed by the MIMO encoder (or MIMO encoding module). MIMO processing can be applied at DP level. Pairs of the Constellation Mapper outputs NUQ ($e_{1,i}$ and $e_{2,i}$) can be fed to the input of the MIMO Encoder. Paired MIMO Encoder output ($g_{1,i}$ and $g_{2,i}$) can be transmitted by the same carrier k and OFDM symbol 1 of their respective TX antennas.

The illustrated diagram shows the MIMO Encoding block, where i is the index of the cell pair of the same XFECBLOCK and Ncells is the number of cells per one XFECBLOCK.

Figure 27:
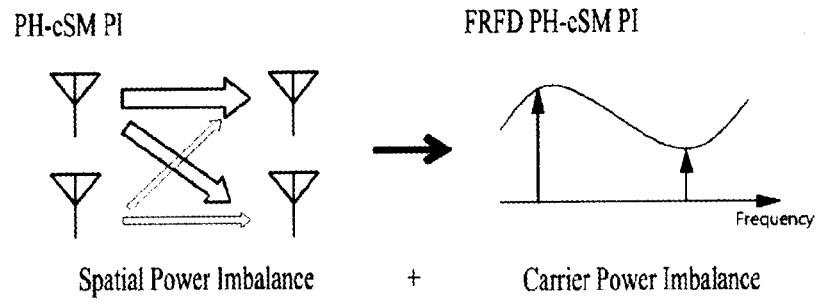
FIG. 27 shows a MIMO encoding scheme according to one embodiment of the present invention.

FIG. 27 shows a MIMO encoding scheme according to one embodiment of the present invention.

If MIMO is used, a broadcast/communication system may transmit more data. However, channel capacity of MIMO may be changed according to channel environment. In addition, if Tx and Rx antennas are different in terms of power or if correlation between channel is high, MIMO performance may deteriorate.

If dual polar MIMO is used, two components may reach a receiver at different power ratios according to propagation property of vertical/horizontal polarity. That is, if dual polar MIMO is used, power imbalance may occur between vertical and horizontal antennas. Here, dual polar MIMO may mean MIMO using vertical/horizontal polarity of an antenna.

In addition, correlation between channel components may increase due to LOS environment between Tx and Rx antennas.

The present invention proposes a MIMO encoding/decoding technique for solving problems occurring upon using MIMO, that is, a technique suitable for a correlated channel environment or a power imbalanced channel environment. Here, the correlated channel environment may be an environment in which channel capacity is lowered and system operation is interrupted if MIMO is used.

In particular, in a MIMO encoding scheme, a PH-eSM PI method and a full-rate full-diversity (FRFD) PH-eSM PI method are proposed in addition to an existing PH-eSM method. The proposed methods may be MIMO encoding methods considering complexity of a receiver and a power imbalanced channel environment. These two MIMO encoding schemes have no restriction on the antenna polarity configuration.

The PH-eSM PI method can provide capacity increase with relatively low complexity increase at the receiver side. The PH-eSM PI method may be referred to as a full-rate spatial multiplexing (FR-SM), FR-SM method, a FR-SM encoding process, etc. In the PH-eSM PI method, rotation angle is optimized to overcome power imbalance with complexity of O (M2). In the PH-eSM PI method, it is possible to effectively cope with spatial power imbalance between Tx antennas.

The FRFD PH-eSM PI method can provide capacity increase and additional diversity gain with a relatively great complexity increase at the receiver side. The FRFD PH-eSM PI method may be referred to as a full-rate full-diversity spatial multiplexing (FRFD-SM), an FRFD-SM method, FRFD-SM encoding process, etc. In the FRFD PH-eSM PI method, additional Frequency diversity gain is achieved by adding complexity of O (M4). In the FRFD PH-eSM PI method, unlike the PH-eSM PI method, it is possible to effectively cope not only with power imbalance between Tx antennas and but also with power imbalance between carriers.

In addition, the PH-eSM PI method and the FRFD PH-eSM PI method may be MIMO encoding schemes applied to symbols mapped to non-uniform QAM, respectively. Here, mapping to non-uniform QAM may mean that constellation mapping is performed using non-uniform QAM. Non-uniform QAM may be referred to as NU QAM, NUQ, etc. PH-eSM PI method and FRFD PH-eSM PI method can also be applied to symbols mapped onto either QAM (uniform QAM) or Non-uniform constellation. The MIMO encoding scheme applied to symbols mapped to non-uniform QAM may have better BER performance than the MIMO encoding scheme applied to symbols mapped to QAM (uniform QAM) per code rate in a power imbalanced situation. However, with certain code rate and bit per channel use, applying MIMO encoding to symbols mapped onto QAM performs better.

In addition, the PH-eSM method may also be applied to non-uniform QAM. Therefore, the present invention further proposes a PH-eSM method applied to symbols mapped to non-uniform QAM.

Hereinafter, constellation mapping will be described.

In constellation mapper, each cell word ($c_{0,l}$, $c_{1,l}$, ..., $c_{\eta_{mod}-1,l}$) from the Bit Interleaver in the base and the handheld profiles, or cell word ($d_{i,0,l}$, $d_{i,1,l}$, ..., $d_{i,\eta_{mod}-1,l}$, where i=1, 2) from the Cell-word Demultiplexer in the advanced profile can be modulated using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, $e_1$.

This constellation mapping is applied only for DPs. The constellation mapping for PLS1 and PLS2 can be different.

QAM-16 and NUQs are square shaped, while NUCs have arbitrary shape. When each constellation is rotated by any multiple of 90 degrees, the rotated constellation overlaps with its original one. This 'rotation-sense' symmetric property makes the capacities and the average powers of the real and imaginary components equal to each other. Both NUQs and NUCs are defined specifically for each code rate and the particular one used is signaled by the parameter DP_MOD in PLS2. The constellation shapes for each code rate mapped onto the complex plane will be described below. Hereinafter, the PH-eSM method and the PH-eSM PI method will be described. A MIMO encoding equation used for the PH-eSM method and the PH-eSM PI method is expressed as follows.

$$\underbrace{\begin{bmatrix} X_1(f_1) \\ X_2(f_1) \end{bmatrix}}_{X} = \frac{1}{\sqrt{1+a^2}} \underbrace{\begin{bmatrix} 1 & 0 \\ 0 & e^{j\phi(q)} \end{bmatrix} \begin{bmatrix} 1 & a \\ a & -1 \end{bmatrix}}_{P} \underbrace{\begin{bmatrix} S_1 \\ S_2 \end{bmatrix}}_{S} \quad \text{[Math figure 9]}$$

or $$\underbrace{\begin{bmatrix} X_1(f_1) \\ X_2(f_1) \end{bmatrix}}_{X} = \frac{1}{\sqrt{1+a^2}} \underbrace{\begin{bmatrix} 1 & 0 \\ 0 & e^{j\phi(q)} \end{bmatrix} \begin{bmatrix} 1 & -a \\ a & 1 \end{bmatrix}}_{P} \underbrace{\begin{bmatrix} S_1 \\ S_2 \end{bmatrix}}_{S}$$

That is, the above equation may be expressed as X=PS. Here, $S_1$ and $S_2$ may denote a pair of input symbols. Here, P may denote a MIMO encoding matrix. Here, $X_1$ and $X_2$ may denote paired MIMO encoder outputs subjected to MIMO encoding.

In the above equation, $e^{j\phi(q)}$ may be expressed as follows.

$$e^{j\phi(q)} = \cos\phi(q) + j\sin\phi(q),$$
$$\phi(q) = \frac{2\pi}{N}q,$$
$$q = 0, \ldots, N_{data} - 1, (N = 9)$$

[Math figure 10]

According to another embodiment, the MIMO encoding equation used for the PH-eSM method and the PH-eSM PI method may be expressed as follows.

$$\begin{bmatrix} g_{1,i} \\ g_{2,i} \end{bmatrix} = \frac{1}{\sqrt{1+a^2}} \begin{bmatrix} 1 & 0 \\ 0 & e^{j\phi(i)} \end{bmatrix} \begin{bmatrix} 1 & a \\ a & -1 \end{bmatrix} \begin{bmatrix} e_{1,i} \\ e_{2,i} \end{bmatrix},$$
$$\phi(i) = \frac{2\pi}{N}i, (N = 9), i = 0, \ldots, \frac{N_{cells}}{2} - 1$$

[Math figure 11]

The PH-eSM PI method can include two steps. The first step can be multiplying the rotation matrix with the pair of the input symbols for the two TX antenna paths, and the second step can be applying complex phase rotation to the symbols for TX antenna 2.

The signals $X_1$ and $X_2$ to be transmitted may be generated using two transmitted symbols (e.g., QAM symbols) $S_1$ and $S_2$. In case of a transmission and reception system using OFDM, $X_1(f_1)$, $X_2(f_2)$ may be carried on a frequency carrier $f_1$ to be transmitted. $X_1$ may be transmitted via a Tx antenna 1 and $X_2$ may be transmitted via a Tx antenna 2. Accordingly, even when power imbalance is present between two Tx antennas, efficient transmission with minimum loss is possible.

At this time, if the PH-eSM method is applied to symbols mapped to QAM, a value a may be determined according to QAM order as follows. This may be a value a when the PH-eSM method is applied to symbols mapped to uniform QAM.

$$a = \frac{\sqrt{2} + 2^{\frac{n}{2}}}{\sqrt{2} + 2^{\frac{n}{2}} - 2}$$

[Math figure 12]

for $2^n QAM + 2^n QAM,$ $$a = \begin{cases} \sqrt{2} + 1 & \text{for } QPSK + QPSK \\ \frac{\sqrt{2}+4}{\sqrt{2}+2} & \text{for } 16QAM + 16QAM \\ \frac{\sqrt{2}+8}{\sqrt{2}+6} & \text{for } 64QAM + 64QAM \\ \frac{\sqrt{2}+16}{\sqrt{2}+14} & \text{for } 256QAM + 256QAM \end{cases}$$

At this time, if the PH-eSM PI method is applied to symbols mapped to QAM, a value a may be determined according to QAM order as follows. This may be a value a when the PH-eSM PI method is applied to symbols mapped to QAM (uniform QAM).

$$a = \sqrt{2} + \left(2^{\frac{n}{2}} - 1\right)$$

[Math figure 13]

for $2^n QAM + 2^n QAM,$ $$a = \begin{cases} \sqrt{2} + 1 & \text{for } QPSK + QPSK \\ \sqrt{2} + 3 & \text{for } 16QAM + 16QAM \\ \sqrt{2} + 7 & \text{for } 64QAM + 64QAM \\ \sqrt{2} + 15 & \text{for } 256QAM + 256QAM \end{cases}$$

At this time, the value a may enable a broadcast/transmission system to obtain good BER performance when considering Euclidean distance and Hamming distance if $X_1$ and $X_2$ are received through a fully correlated channel and are decoded. In addition, the value a may enable the broadcast/communication system to obtain good BER performance when considering Euclidean distance and Hamming distance if $X_1$ and $X_2$ are independently decoded at the receiver side (that is, if $S_1$ and $S_2$ are decoded using $X_1$ and $S_1$ and $S_2$ are decoded using $X_2$).

The PH-eSM PI method is different from the PH-eSM method in that the value a is optimized in a power imbalanced situation. That is, in the PH-eSM PI method, a rotation angle value is optimized in a power imbalance situation. In particular, when the PH-ESM PI method is applied to symbols mapped to non-uniform QAM, the value a may be optimized as compared to the PH-eSM method.

The above-described value a is merely exemplary and may be changed according to embodiment.

The receiver used for the PH-eSM method and the PH-eSM PI method may decode a signal using the above-described MOMI encoding equation. At this time, the receiver may decode a signal using ML, Sub-ML (Sphere) decoding, etc.

Hereinafter, an FRFD PH-eSM PI method will be described. The MIMO encoding equation used for the FRFD PH-eSM PI method is as follows.

$$\begin{bmatrix} X_1(f_1) & X_1(f_2) \\ X_2(f_1) & X_2(f_2) \end{bmatrix} = \frac{1}{\sqrt{1+a^2}} \begin{bmatrix} 1 & 0 \\ 0 & e^{j\phi(q)} \end{bmatrix}$$

[Math figure 14]

$$\underbrace{\begin{bmatrix} S_1 + aS_2 & aS_3 - S_4 \\ S_3 + aS_4 & aS_1 - S_2 \end{bmatrix}}_{\text{Frequency diversity}} \Bigg\} \text{Spatial diversity}$$

or $$\begin{bmatrix} X_1(f_1) & X_1(f_2) \\ X_2(f_1) & X_2(f_2) \end{bmatrix} =$$

$$\frac{1}{1+a^2} \begin{bmatrix} 1 & 0 \\ 0 & e^{j\phi(q)} \end{bmatrix} \begin{bmatrix} S_1 - aS_2 & aS_3 + S_4 \\ S_3 - aS_4 & aS_1 + S_2 \end{bmatrix}$$

By using two antennas $X_1$ and $X_2$, it is possible to obtain spatial diversity. In addition, by utilizing two frequencies $f_1$ and $f_2$, it is possible to obtain frequency diversity.

According to another embodiment of the present invention, a MIMO encoding scheme used for the FRFD PH-eSM PI method may be expressed as follows.

$$\begin{bmatrix} g_{1,2i} & g_{1,2i+1} \\ g_{2,2i} & g_{2,2i+1} \end{bmatrix} = \frac{1}{\sqrt{1+a^2}} \begin{bmatrix} 1 & 0 \\ 0 & e^{j\phi(i)} \end{bmatrix}$$

[Math figure 15]

-continued $$\begin{bmatrix} e_{1,2i} + ae_{2,2i} & ae_{1,2i+1} - e_{2,2i+1} \\ e_{1,2i+1} + ae_{2,2i+1} & ae_{1,2i} - e_{2,2i} \end{bmatrix},$$

$$\phi(i) = \frac{2\pi}{N}i,$$

$$(N = 9),$$

$$i = 0, \dots, \frac{N_{cells}}{4} - 1$$

The FRFD PH-eSM PI method can take two pairs of NUQ symbols (or Uniform QAM symbols or NUC symbols) as input to provide two pairs of MIMO output symbols.

The FRFD PH-eSM PI method requires more decoding complexity of a receiver but may have better performance. According to the FRFD PH-eSM PI method, a transmitter generates signals $X_1(f_1), X_2(f_1), X_1(f_2)$ and $X_2(f_2)$ to be transmitted using four transmit symbols $S_1, S_2, S_3, S_4$. At this time, the value a may be equal to the value a used for the above-described PH-eSM PI method. This may be a value a when the FRFD PH-eSM method is applied to symbols mapped to QAM (uniform QAM).

The MIMO encoding equation of the FRFD PH-eSM PI method may use frequency carriers $f_1$ and $f_2$ unlike the MIMO encoding equation of the above-described PH-eSM PI method. Therefore, the FRFD PH-eSM PI method may efficiently cope not only with power imbalance between Tx antennas but also with power imbalance between carriers.

In association with MIMO encoding, a structure for additionally obtaining frequency diversity may include Golden code, etc. The FRFD PH-eSM PI method according to the present invention can obtain frequency diversity with complexity lower than that of Golden code.

Figure 28:
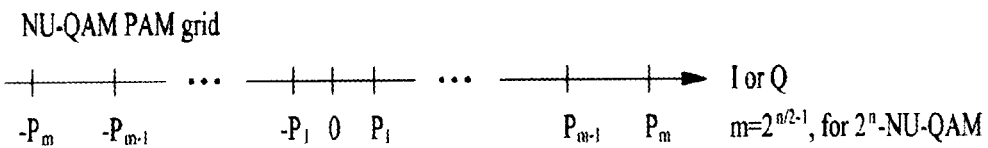
FIG. 28 is a diagram showing a PAM grid of an I or Q side according to non-uniform QAM according to one embodiment of the present invention.

FIG. 28 is a diagram showing a PAM grid of an I or Q side according to non-uniform QAM according to one embodiment of the present invention.

The above-described PH-eSM PI and FRFD PH-eSM PI methods are applicable to symbols mapped to non-uniform QAM. Non-uniform QAM is a modulation scheme which obtains higher capacity by adjusting a PAM grid value per SNR unlike QAM (uniform QAM). It is possible to obtain more gain by applying MIMO to symbols mapped to non-uniform QAM. In this case, the encoding equations of the PH-eSM PI and FRFD PH-eSM PI methods are not changed but a new value "a" may be necessary when the PH-eSM PI and FRFD PH-eSM PI methods are applied to symbols mapped to non-uniform QAM. This new value "a" may be obtained using the following equation.

$$a = b(P_m - P_{m-1}) + P_m \quad \text{[Math figure 16]}$$

for $$2^n QAM + 2^n QAM,$$

$$m = 2^{\frac{n}{2}-1}$$

for $$2^n QAM$$

This new value "a" may be a value a when the PH-eSM PI and FRFD PH-eSM PI methods are applied to symbols mapped to non-uniform QAM.

As shown in this figure, the PAM grid of the I or Q side used for non-uniform QAM is defined and the new value "a" may be obtained using a largest value $P_m$ and a second largest value $P_{m-1}$ of this grid. A signal transmitted via the Tx antenna may be suitably decoded using this new value "a" alone.

In the equation for generating the new value "a", b denotes a sub-constellation separation factor. By adjusting the value b, a distance between sub-constellations present in a MIMO encoded signal may be adjusted. In case of non-uniform AM, since a distance between constellations (or a distance between sub-constellations) is changed, a variable b may be necessary. Examples of the value b may include $$\frac{\sqrt{2}}{2}.$$

This value may be obtained by Hamming distance and Euclidean distance based on a point having highest power on a constellation and points adjacent thereto.

In case of non-uniform QAM, since a grid value optimized per SNR (or code-rate of FEC) is used, the sub-constellation separation factor "b" may also use a value optimized per SNR (or code-rate of FEC). That is, capacity of constellation transmitted after MIMO encoding may be analyzed according to the value "b" and the SNR (or code-rate of FEC) to find the value "B" for providing maximum capacity at a specific SNR (target SNR).

For example, if NU-16 QAM+NU-16 QAM MIMO and P={1, 3.7}, the new value "a" may be computed by $$a = \frac{\sqrt{2}}{2}(3.7 - 1) + 3.7.$$

At this time, the value b is set to $$\frac{\sqrt{2}}{2}.$$

For example, NU-64 QAM+NU-64 QAM MIMO and P={1, 3.27, 5.93, 10.27}, the new value "a" may be computed by $$a = \frac{\sqrt{2}}{2}(10.27 - 5.93) + 10.27.$$

At this time, the value b is set to $$\frac{\sqrt{2}}{2}.$$

For example, if NU-256 QAM+NU-256 QAM MIMO and P={1, 1.02528, 3.01031, 3.2249, 5.2505, 6.05413, 8.48014, 11.385}, the new value "a" may be computed by $$a = \frac{\sqrt{2}}{2}(11.385 - 8.48014) + 11.385.$$

At this time, the value b is set to $$\frac{\sqrt{2}}{2}.$$

As described above, the PH-eSM PI and FRFD PH-eSM PI methods may be applied to symbols mapped to non-uniform QAM. Similarly, the PH-eSM method may also be applied to symbols mapped to non-uniform QAM. In this case, the value "a" may be determined according to the PH-eSM method. An equation for determining the value "a" is as follows.

$$a = \frac{b(P_m - P_{m-1}) + P_m + 1}{b(P_m - P_{m-1}) + P_m - 1} \quad \text{[Math figure 17]}$$

for $$2^n QAM + 2^n QAM,$$

$$m = 2^{\frac{n}{2}-1}$$

for $$2^n QAM$$

This new value "a" may be a value a when the PH-eSM method is applied to symbols mapped to non-uniform QAM.

b is a sub-constellation separation factor as described above. As described above, the value "b" may be optimized to suit each SNR (or code-rate of FEC) by analyzing capacity of the encoded constellation.

For example, if NU-16 QAM+NU-16 QAM MIMO and P={1, 3.7}, the new value "a" may be computed by $$a = \frac{\frac{\sqrt{2}}{2}(3.7-1) + 3.7 + 1}{\frac{\sqrt{2}}{2}(3.7-1) + 3.7 - 1}.$$

At this time, the value b is set to $$\frac{\sqrt{2}}{2}.$$

For example, if NU-64 QAM+NU-64 QAM MIMO and P={1, 3.27, 5.93, 10.27}, the new value "a" may be computed by $$a = \frac{\frac{\sqrt{2}}{2}(10.27 - 5.93) + 10.27 + 1}{\frac{\sqrt{2}}{2}(10.27 - 5.93) + 10.27 - 1}.$$

At this time, the value b is set to $$\frac{\sqrt{2}}{2}.$$

For example, if NU-256 QAM+NU-256 QAM MIMO and P={1, 1.02528, 3.01031, 3.2249, 5.2505, 6.05413, 8.48014, 11.385}, the new value "a" may be computed by $$a = \frac{\frac{\sqrt{2}}{2}(11.385 - 8.48014) + 11.385 + 1}{\frac{\sqrt{2}}{2}(11.385 - 8.48014) + 11.385 - 1}.$$

At this time, the value b is set to $$\frac{\sqrt{2}}{2}.$$

Hereinafter, a method of determining NU-QAN and MIMO encoding parameter "a" in the MIMO encoding method (the PH-eSM PI method and the FRFD PH-eSM PI method) applied to symbols mapped to NU-QAM optimized per SNR (or code-rate of FEC) will be described.

In order to apply the PH-eSM PI method and the FRFD PH-eSM PI method to symbols mapped to NU-QAM per SNR (or code-rate of FEC), the following two elements should be considered. First, in order to obtain shaping gain, NU-QAM optimized per SNR should be found. Second, the MIMO encoding parameter "a" should be determined in each NU-QAM optimized per SNR.

The MIMO encoding scheme (the PH-eSM PI method and the FRFD PH-eSM PI method), NU-QAM and MIMO encoding parameter suitable for each SNR may be determined through capacity analysis as follows. Here, capacity may mean BICM capacity. The process of determining a NU-QAM and MIMO encoding parameter suitable for each SNR may be performed in consideration of correlated channel and power imbalanced channel.

If computation for capacity analysis at MIMO channel is acceptable, it is possible to determine NU-QAM for optimized MIMO, which provides maximum capacity at a target SNR.

If computation is not acceptable, NU-QAM for MIMO may be determined using NU-QAM optimized for SISO. First, with respect to NU-QAM optimized for SISO per SNR (or code-rate of FEC), BER performance comparison may be performed in a non-power imbalanced MIMO channel environment. Through BER performance comparison, NU-QAM for MIMO may be determined from NU-QAM (FEC code rate 5/15, 6/15, ... 13/15) optimized for SISO. For example, constellation for MIMO at code-rate 5/15 of 12 bpcu (NU-64QAM+NU-64QAM) may be set to NU-64QAM corresponding to SISO code-rate 5/15. In addition, for example, constellation of MIMO FEC code rate 6/15 may be constellation of SISO FEC code rate 5/15. That is, constellation of SISO FEC code rate 5/15 may suitable for MIMO FEC code rate 6/15.

Once NU-QAM is determined, the MIMO encoding parameter "a" optimized per SNR may be determined at a power imbalanced MIMO channel through capacity analysis based on the determined NU-QAM. For example, in the 12 bpcu and 5/15 code rate environment, the value a may be 0.1571.

Hereinafter, measurement for performance of MIMO encoding according to the value a will be described. For performance measurement, BICM capacity may be measured. Through this operation, the value a capable of maximizing BICM capacity is determined.

BICM capacity may be expressed by the following equations.

$$BICM\ cap. = \quad \text{[Math figure 18]}$$

$$\int_{\varphi} \left( \sum_i \left( \int_Y p(b_j = 0, Y) \log_2 \frac{p(b_i = 0, Y)}{p(b_i = 0)p(Y)} dY + \int_Y p(b_i = 1, Y) \log_2 \frac{p(b_i = 1, Y)}{p(b_i = 1)p(Y)} dY \right) p(\varphi) \right) d\varphi$$

$$p(b_i = j, Y) = p(Y | b_i = j) \cdot p(b_i = j) \quad \text{[Math figure 19]}$$

$$= \sum_{M_j} p(Y | S = M_j) \cdot \frac{1}{M^2}$$

$$= \sum_{M_j} \frac{1}{\pi \sigma^2} e^{\frac{-\|Y - H_{PI} P M_j\|^2}{\sigma^2}} \cdot \frac{1}{M^2}$$

$$\frac{p(b_i = j, Y)}{p(b_i = j)p(Y)} = \frac{p(Y | b_i = j)}{p(Y)} \quad \text{[Math figure 20]}$$

$$= \frac{p(Y | b_i = j)}{\sum_j p(b_i = j, Y)}$$

$$= \frac{\sum_{M_i} \frac{1}{\pi \sigma^2} e^{\frac{-\|Y - H_{PI} P M_j\|^2}{\sigma^2}} \cdot \frac{2}{M^2}}{\sum_j \sum_{M_i} \frac{1}{\pi \sigma^2} e^{\frac{-\|Y - H_{PI} P M_j\|^2}{\sigma^2}} \cdot \frac{1}{M^2}}$$

Here, $p(b_i=0)=p(b_i=1)=0.5$. In addition, $p(S=M_j)=1/M^2$, $p(\phi)=1/\pi$. Here, $S \in$ {constellation set} and M may mean a constellation size.

Here, Y may be expressed as follows.

$$\begin{bmatrix} Y_1(f_1) \\ Y_2(f_1) \end{bmatrix} = \frac{1}{\sqrt{1+\alpha^2}} \begin{bmatrix} 1 & \alpha \cdot e^{j\varphi} \\ e^{j\varphi} & \alpha \end{bmatrix} \begin{bmatrix} X_1(f_1) \\ X_2(f_1) \end{bmatrix} + \begin{bmatrix} n_1 \\ n_2 \end{bmatrix} \quad \text{[Math figure 21]}$$

$$Y = \begin{bmatrix} Y_1(f_1) \\ Y_2(f_1) \end{bmatrix}$$

$$H_{PI} = \frac{1}{\sqrt{1+\alpha^2}} \begin{bmatrix} 1 & \alpha \cdot e^{j\varphi} \\ e^{j\varphi} & \alpha \end{bmatrix}$$

$$X = \begin{bmatrix} X_1(f_1) \\ X_2(f_1) \end{bmatrix}$$

$$n = \begin{bmatrix} n_1 \\ n_2 \end{bmatrix}$$

That is, $Y=H_{PI}X+n$. Here, n may be AWGN. X may be expressed by X=PS as described above. BICM capacity may assume AWGN and individually identically distributed (IID) input. In addition, $\phi$ may mean a uniform random variable $U(0, \pi)$. In order to consider a correlated channel environment and a power imbalanced channel environment which may occur upon using MIMO, $H_{PI}$ of the above-described equation may be assumed. At this time, an alpha value is a power imbalance (PI) factor and may be PI 9 dB: 0.354817, PI 6 dB: 0.501187 or PI 3 dB: 0.70711 according to PI. Here, $M_j \in$ {constellation set|$b_i$=j}.

Through this equation, BICM capacity according to the value a may be measured to determine an optimal value a.

That is, the method for determining the MIMO encoding parameter may include two steps as follows.

Step 1. Through BER performance comparison for constellation of SISO FEC code rate, NU-QAM having optimal performance of MIMO FEC code-rate to be found is selected.

Step 2. Based on NU-QAM obtained in Step 1, an encoding parameter "a" having optimal performance may be determined through the above-described BICM capacity analysis.

The value a according to constellation per code rate is shown in the following table. This is merely an example of the value a according to the present invention.

TABLE 34

| | 8 bpcu | | 12 bpcu | |
|---|---|---|---|---|
| Code rate | Constellation | a | Constellation | a |
| 5/15 | QAM-16 | 0 | NUQ-64 for CR = 5/15 | 0.1571 |
| 6/15 | QAM-16 | 0.0035 | NUQ-64 for CR = 5/15 | 0.1396 |
| 7/15 | QAM-16 | 0.1222 | NUQ-64 for CR = 6/15 | 0.2129 |
| 8/15 | QAM-16 | 0.1571 | NUQ-64 for CR = 8/15 | 0.2548 |
| 9/15 | QAM-16 | 0.1710 | NUQ-64 for CR = 11/15 | 0.2653 |
| 10/15 | QAM-16 | 0.1780 | NUQ-64 for CR = 12/15 | 0.2566 |
| 11/15 | QAM-16 | 0.1798 | NUQ-64 for CR = 12/15 | 0.2548 |
| 12/15 | QAM-16 | 0.1815 | NUQ-64 for CR = 13/15 | 0.2583 |
| 13/15 | QAM-16 | 0.1815 | NUQ-64 for CR = 13/15 | 0.2583 |

The PH-eSM PI method can be applied for 8 bpcu and 12 bpcu with 16K and 64K FECBLOCK. PH-eSM PI method can use the MIMO encoding parameters defined in the above table for each combination of a value of bits per channel use and code rate of an FECBLOCK. Detailed constellations corresponding to the illustrated MIMO parameter table are described below.

The above table shows constellation and MIMO encoding parameter a optimized per code rate. For example, in case of 12 bpcu and code rate of 6/15 of MIMO encoding, constellation of NUQ-64 which is used in case of code rate of 5/15 of SISO encoding may be used. That is, in case of 12 bpcu and code rate of 6/15 of MIMO encoding, constellation of code rate of 5/15 of SISO encoding may be an optimal value. At this time, the value "a" may be 0.1396.

TABLE 35

| | 10 bpcu | |
|---|---|---|
| Code rate | Constellation | a |
| 5/15 | QAM-16/NUQ-64 for CR = 5/15 | 0 |
| 6/15 | QAM-16/NUQ-64 for CR = 5/15 | 0 |
| 7/15 | QAM-16/NUQ-64 for CR = 6/15 | 0 |
| 6/15 | QAM-16/NUQ-64 for CR = 8/15 | 0 |
| 9/15 | QAM-16/NUQ-64 for CR = 11/15 | 0 |
| 10/15 | QAM-16/NUQ-64 for CR = 12/15 | 0 |
| 11/15 | QAM-16/NUQ-64 for CR = 12/15 | 0 |
| 12/15 | QAM-16/NUQ-64 for CR = 13/15 | 0 |
| 13/15 | QAM-16/NUQ-64 for CR = 13/15 | 0 |

For the 10 bpcu MIMO case, PH-eSM PI method can use the MIMO encoding parameters defined in the above table. These parameters are especially useful when there is a power imbalance between horizontal and vertical transmission (e.g. 6 dB in current U.S. Elliptical pole network). The QAM-16 can be used for the TX antenna of which the transmission power is deliberately attenuated. Detailed constellations corresponding to the illustrated MIMO parameter table are described below.

The FRFD PH-eSM PI method can use the MIMO encoding parameters of the PH-eSM PI method defined in the above tables for each combination of a value of bit per channel use and code rate of an FECBLOCK.

The values "a" of the above table may be determined in consideration of Euclidean distance and Hamming distance and are optimal in code rate and constellation. Accordingly, it is possible to obtain excellent BER performance.

Figure 29:
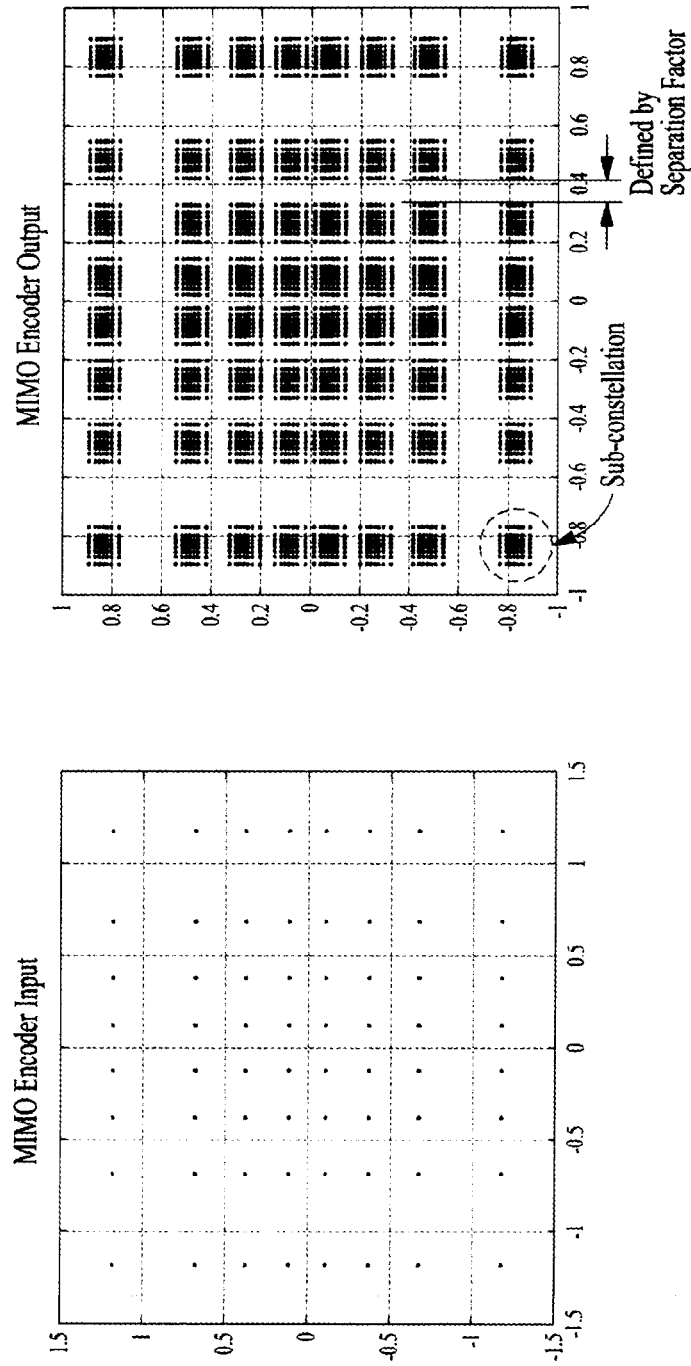
FIG. 29 is a diagram showing MIMO encoding input/output when the PH-eSM PI method is applied to symbols mapped to non-uniform 64 QAM according to one embodiment of the present invention.

FIG. 29 is a diagram showing MIMO encoding input/output when the PH-eSM PI method is applied to symbols mapped to non-uniform 64 QAM according to one embodiment of the present invention.

Even when the FRFD PH-eSM PI according to one embodiment of the present invention is applied to symbols mapped to non-uniform QAM, an input/output diagram similar to this figure may be obtained. If the above-described new value "a" and the encoding matrix of the MIMO encoding equation are used, the constellation shown in this figure may be obtained by the MIMO encoder input and output.

In the MIMO encoder output of this figure, sub-constellations may be located. At this time, a distance between sub-constellations may be determined by the above-described sub-constellation separation factor "b". The MIMO encoded constellations may maintain a non-uniform property.

Figure 30:
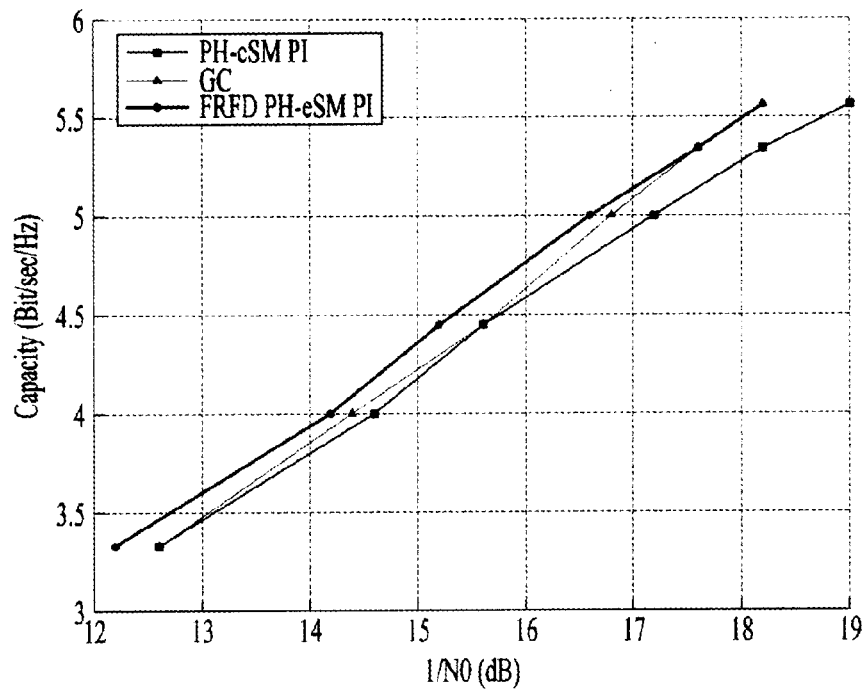
FIG. 30 is a graph for comparison in performance of MIMO encoding schemes according to the embodiment of the present invention.

FIG. 30 is a graph for comparison in performance of MIMO encoding schemes according to the embodiment of the present invention.

This graph shows comparison in capacity between MIMO encoding schemes in an 8-bpcu/outdoor environment. The PH-eSM PI and FRFD PH-eSM PI methods of the present invention exhibit better performance than an existing MIMO encoding scheme (GC, etc.) in terms of capacity. This means that more efficient transmission is possible in the same environment as compared with other MIMO techniques.

Figure 31:
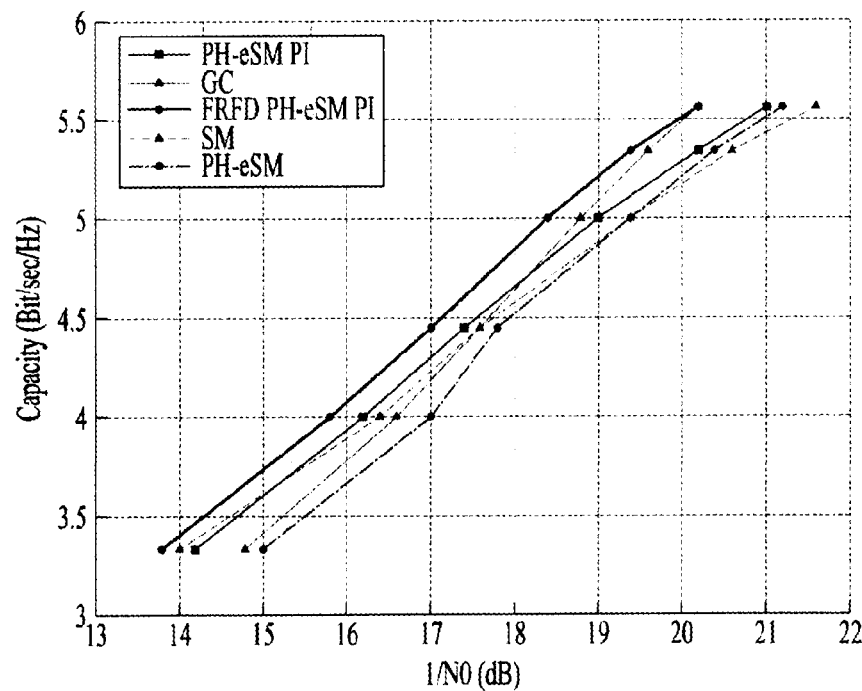
FIG. 31 is a graph for comparison in performance of MIMO encoding schemes according to the embodiment of the present invention.

FIG. 31 is a graph for comparison in performance of MIMO encoding schemes according to the embodiment of the present invention.

This graph shows comparison in capacity according to MIMO encoding schemes in an 8-bpcu/outdoor/HPI9 environment. The PH-eSM PI and FRFD PH-eSM PI methods of the present invention exhibits better performance than an existing MIMO encoding scheme (SM, GC, PH-eSM, etc.) in terms of capacity. This means that more efficient transmission is possible in the same environment as compared with other MIMO techniques.

Figure 32:
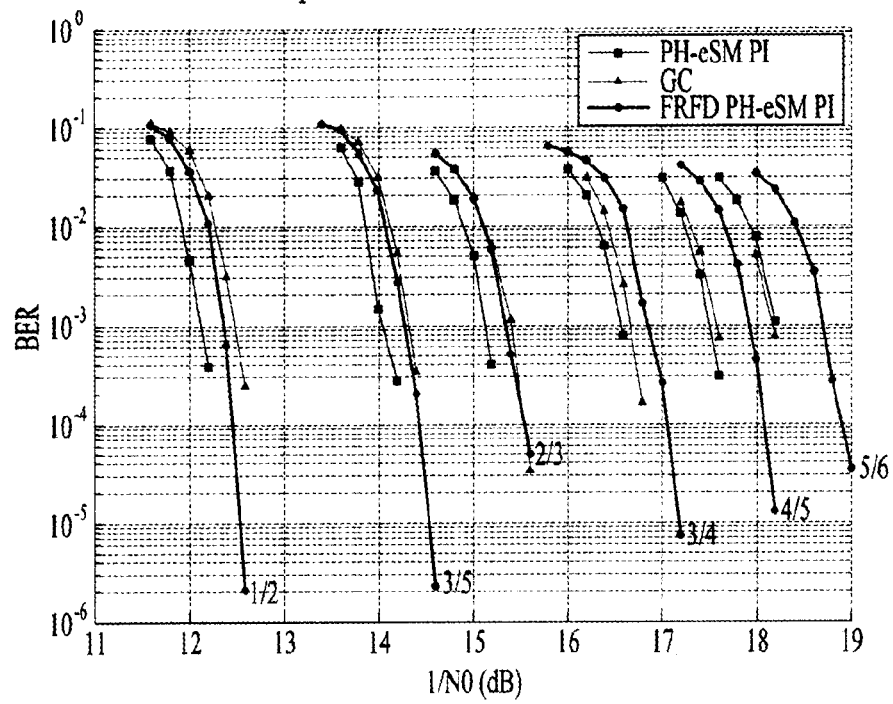
FIG. 32 is a graph for comparison in performance of MIMO encoding schemes according to the embodiment of the present invention.

FIG. 32 is a graph for comparison in performance of MIMO encoding schemes according to the embodiment of the present invention.

This graph shows comparison in BER according to MIMO encoding schemes in an 8-bpcu/outdoor/random BI, TI environment. The PH-eSM PI and FRFD PH-eSM PI methods of the present invention exhibits better performance than an existing MIMO encoding scheme (GC, etc.) in terms of BER. This means that more efficient transmission is possible in the same environment as compared with other MIMO techniques.

Figure 33:
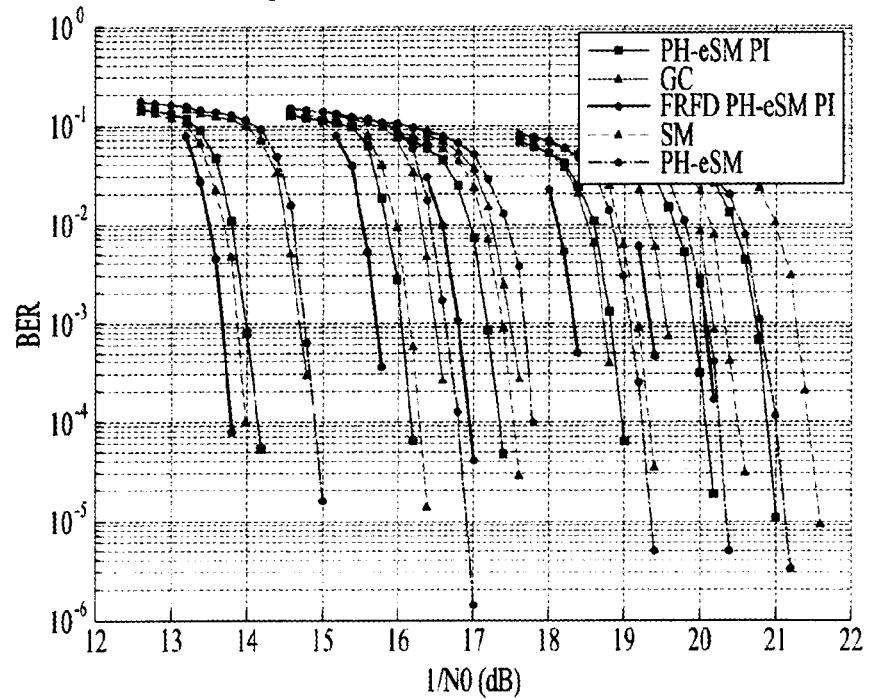
FIG. 33 is a graph for comparison in performance of MIMO encoding schemes according to the embodiment of the present invention.

FIG. 33 is a graph for comparison in performance of MIMO encoding schemes according to the embodiment of the present invention.

This graph shows comparison in BER according to MIMO encoding schemes in an 8-bpcu/outdoor/HPI9/random BI, TI environment. BER Performance of the PH-eSM PI and FRFD PH-eSM PI methods of the present invention is better than that of existing MIMO encoding (SM, GC, PH-eSM, etc.) in terms of capacity. This means that more efficient transmission is possible in the same environment as compared other MIMO techniques.

Figure 34:
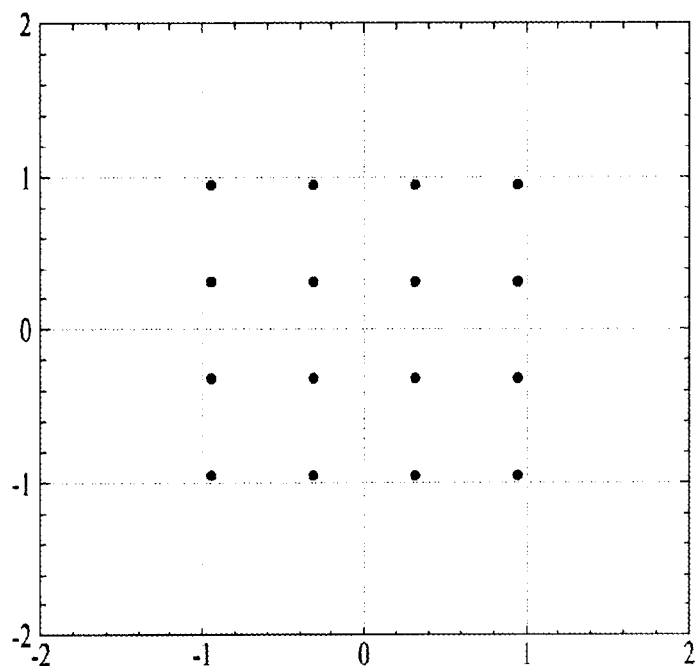
FIG. 34 is a diagram showing an embodiment of QAM-16 according to the present invention.

FIG. 34 is a diagram showing an embodiment of QAM-16 according to the present invention.

This figure shows a constellation shape of QAM-16 on a complex plane. This figure shows the constellation shape of QAM-16 for all code rates.

Figure 35:
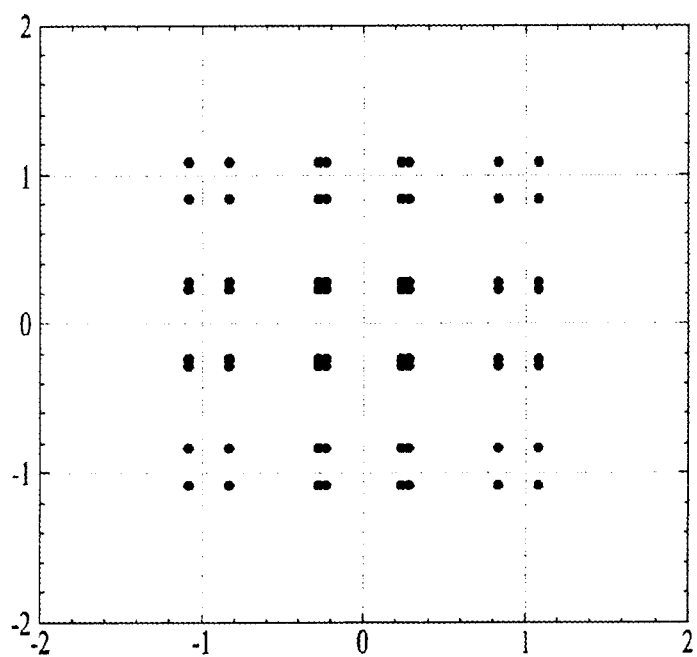
FIG. 35 is a diagram showing an embodiment of NUQ-64 for 5/15 code rate according to the present invention.

FIG. 35 is a diagram showing an embodiment of NUQ-64 for 5/15 code rate according to the present invention.

This figure shows the constellation shape of QAM-64 for 5/15 code rate on a complex plane.

Figure 36:
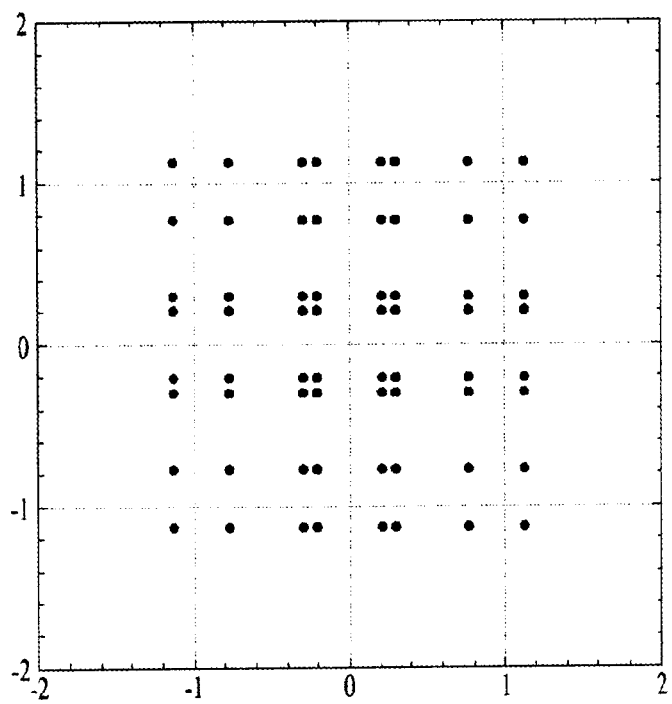
FIG. 36 is a diagram showing an embodiment of NUQ-64 for 6/15 code rate according to the present invention.

FIG. 36 is a diagram showing an embodiment of NUQ-64 for 6/15 code rate according to the present invention.

This figure shows the constellation shape of QAM-64 for 6/15 code rate on a complex plane.

Figure 37:
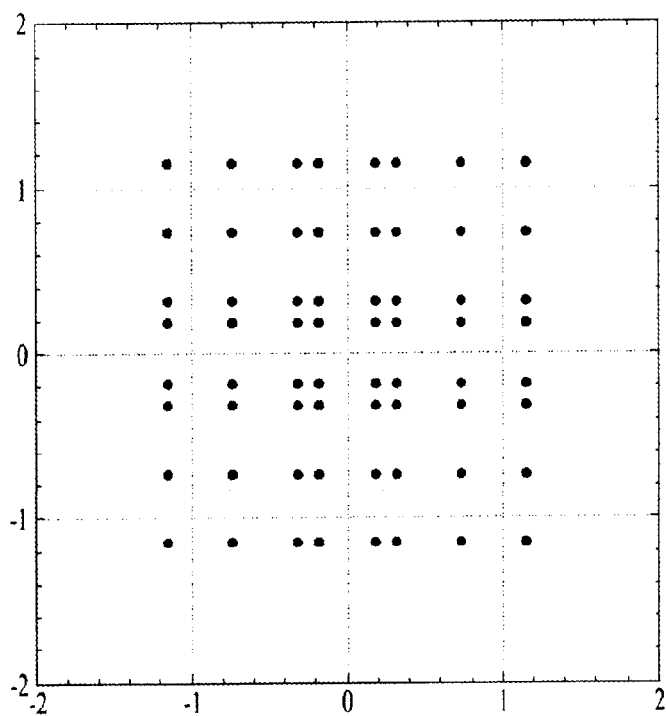
FIG. 37 is a diagram showing an embodiment of NUQ-64 for 7/15 code rate according to the present invention.

FIG. 37 is a diagram showing an embodiment of NUQ-64 for 7/15 code rate according to the present invention.

This figure shows the constellation shape of QAM-64 for 7/15 code rate on a complex plane.

Figure 38:
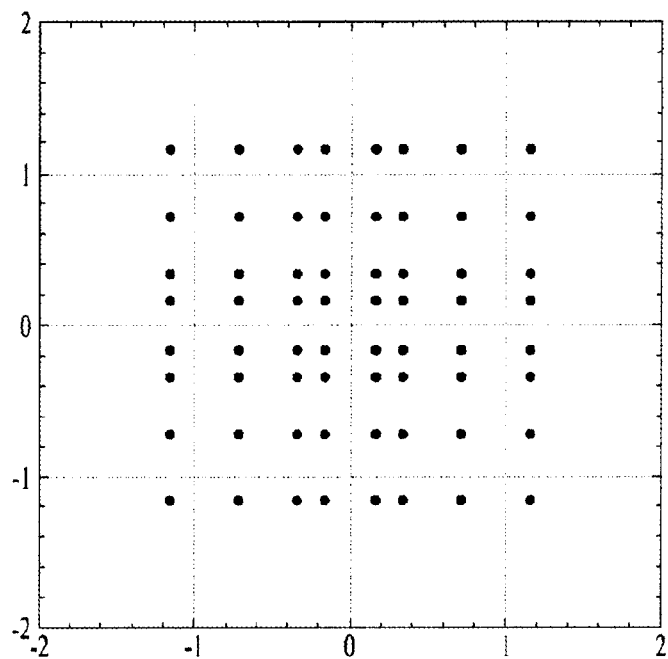
FIG. 38 is a diagram showing an embodiment of NUQ-64 for 8/15 code rate according to the present invention.

FIG. 38 is a diagram showing an embodiment of NUQ-64 for 8/15 code rate according to the present invention.

This figure shows the constellation shape of QAM-64 for 8/15 code rate on a complex plane.

Figure 39:
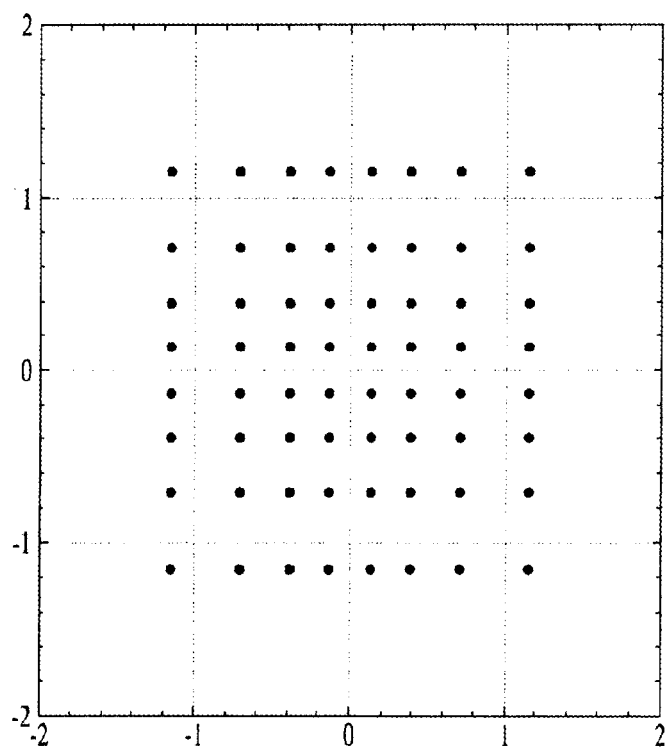
FIG. 39 is a diagram showing an embodiment of NUQ-64 for 9/15 and 10/15 code rates according to the present invention.

FIG. 39 is a diagram showing an embodiment of NUQ-64 for 9/15 and 10/15 code rates according to the present invention.

This figure shows the constellation shape of QAM-64 for 9/15 and 10/15 code rates on a complex plane.

Figure 40:
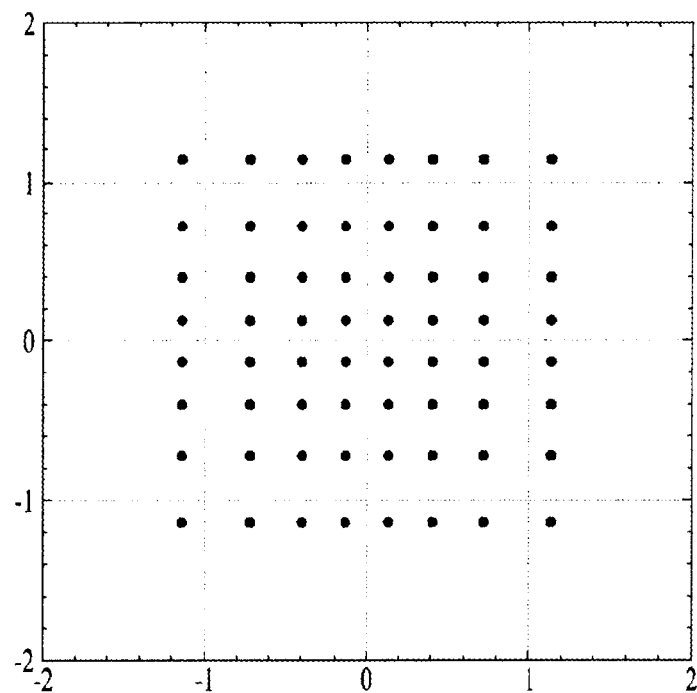
FIG. 40 is a diagram showing an embodiment of NUQ-64 for 11/15 code rate according to the present invention.

FIG. 40 is a diagram showing an embodiment of NUQ-64 for 11/15 code rate according to the present invention.

This figure shows the constellation shape of QAM-64 for 11/15 code rate on a complex plane.

Figure 41:
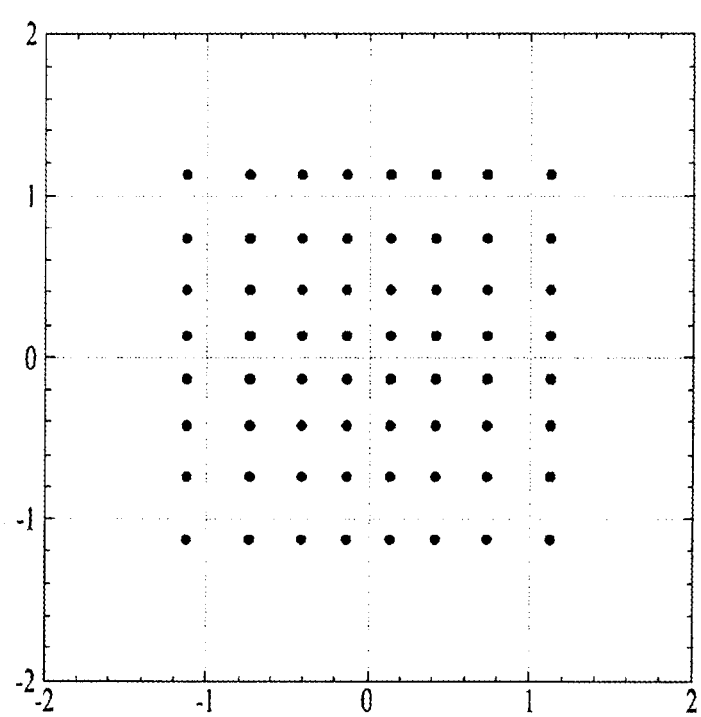
FIG. 41 is a diagram showing an embodiment of NUQ-64 for 12/15 code rate according to the present invention.

FIG. 41 is a diagram showing an embodiment of NUQ-64 for 12/15 code rate according to the present invention.

This figure shows the constellation shape of QAM-64 for 12/15 code rate on a complex plane.

Figure 42:
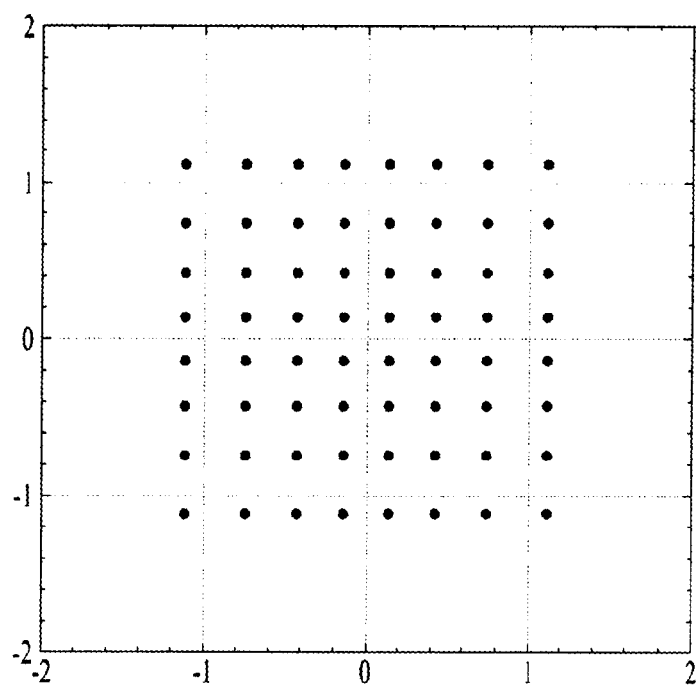
FIG. 42 is a diagram showing an embodiment of NUQ-64 for 13/15 code rate according to the present invention.

FIG. 42 is a diagram showing an embodiment of NUQ-64 for 13/15 code rate according to the present invention.

This figure shows the constellation shape of QAM-64 for 13/15 code rate on a complex plane.

Figure 43:
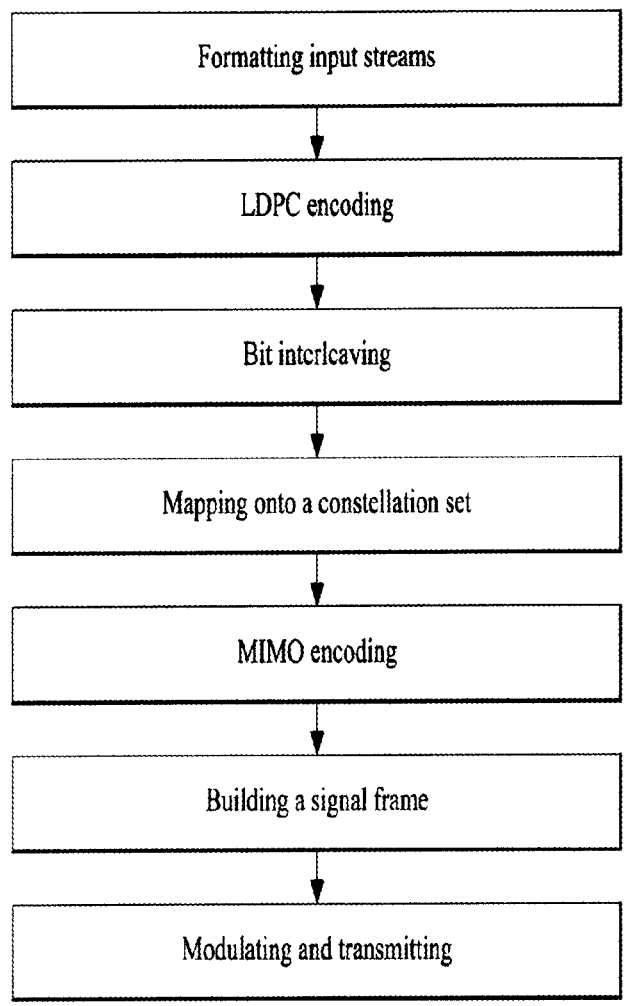
FIG. 43 is a method of transmitting broadcast signals according to an embodiment of the present invention.

FIG. 43 is a method of transmitting broadcast signals according to an embodiment of the present invention.

The method includes formatting input streams, LDPC encoding, bit interleaving, mapping onto a constellations, MIMO encoding, building a signal frame and/or modulating and transmitting.

In step of formatting input streams, the above-described input formatting module may format input streams into DP data. DP data can means Data Pipe.

In step of LDPC encoding, the above-described BICM module may LDPC encode the DP data according to a code rate. The code rate can be configurable. By adjusting the code rate, LDPC encoding can be changed. The LDPC encoding may correspond to above-described LDPC encoding.

In step of bit interleaving, the above-described BICM module may conduct bit interleaving. The bit interleaving may correspond to above-described bit interleaving.

In step of mapping onto a constellations, the above-described BICM module may map the bit interleaved DP data onto constellations according to one of QAM (Quadrature Amplitude Modulation), NUQ (Non-Uniform QAM) or NUC (Non-Uniform Constellation). The QAM, NUQ, NUC may correspond to above-described QAM, NUQ, NUC. The constellations may also be referred as a constellation set. The data in each DP path can be mapped onto different constellations. For example, DP data in a DP path can be mapped onto QAM, while DP data in other DP path can be mapped onto NUQ.

In step of MIMO encoding, the above-described BICM module may MIMO encode the mapped DP data by using a MIMO encoding matrix having a MIMO encoding parameter. The MIMO encoding may correspond to above-described MIMO encoding. The MIMO encoding can be performed on data which is mapped onto NUQ or NUC.

In step of building a signal frame, the above-described frame building module may build at least one signal frame by mapping the MIMO encoded DP data. The frame building may correspond to above-described frame building.

In step of modulating and transmitting, the above-described OFDM modulating module may modulate data in the built signal frame by Orthogonal Frequency Division Multiplexing, OFDM, method. Also, the OFDM modulating module may transmit the broadcast signals having the modulated data. The modulating and transmitting may correspond to above-described modulating and transmitting.

In a method of transmitting broadcast signal according to other embodiment of the present invention, the MIMO encoding can be performed according to either FR-SM (Full-rate spatial multiplexing) method or FRFD-SM (Full-rate Full-diversity spatial multiplexing) method. The FR-SM method and FRFD-SM method may correspond to above-described MIMO encoding method, FR-SM and FRFD-SM, which also can be referred as PH-eSM PI and FRFD PH-eSM PI method.

In a method of transmitting broadcast signal according to another embodiment of the present invention, the QAM, the NUQ and the NUC can be defined depending on the code rate.

In a method of transmitting broadcast signal according to another embodiment of the present invention, the MIMO encoding parameter can be defined based on one of the QAM, the NUQ or the NUC. The MIMO encoding parameter may correspond to above-described 'a'. The MIMO encoding parameter can be determined constellations (QAM, NUQ or NUC) and/or a code rate, as described above.

The above-described steps can be omitted or replaced by steps executing similar or identical functions according to design.

Figure 44:
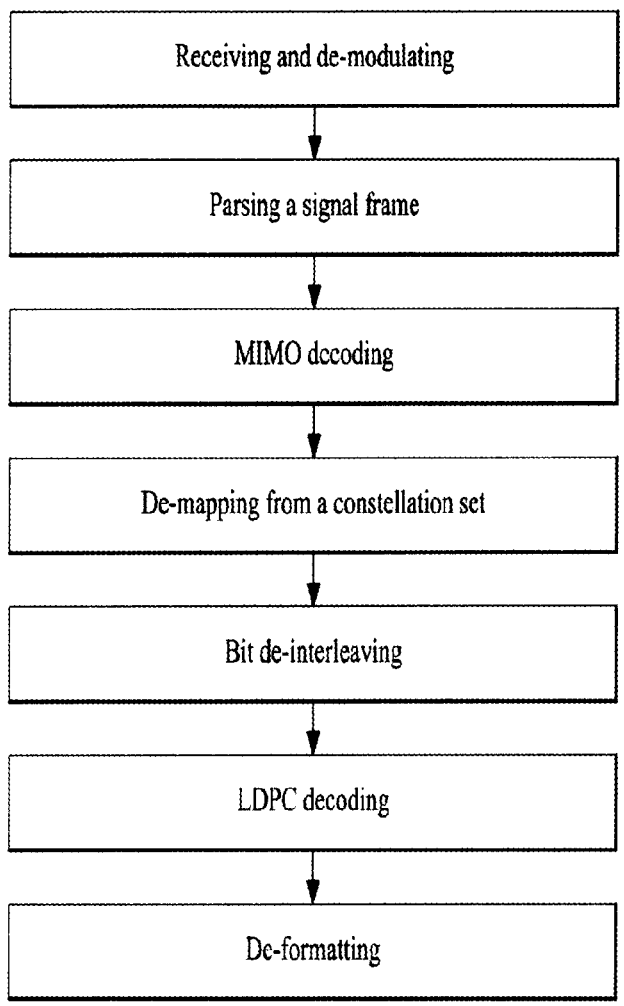
FIG. 44 is a method of receiving broadcast signals according to an embodiment of the present invention.

FIG. 44 is a method of receiving broadcast signals according to an embodiment of the present invention.

The method includes receiving and de-modulating, parsing a signal frame, MIMO decoding, de-mapping from constellations, bit de-interleaving, LDPC decoding and/or de-formatting.

In step of receiving and de-modulating, the above-described OFDM demodulating module may receive the broadcast signals having at least one signal frame and demodulate data in the at least one signal frame by an Orthogonal Frequency Division Multiplexing, OFDM, method. The receiving and de-modulating may correspond to above-described receiving and de-modulating.

In step of parsing a signal frame, the above-described frame parsing module may parse the at least one signal frame by de-mapping Data Pipe, DP, data. The parsing a signal frame may correspond to parsing a signal frame.

In step of MIMO decoding, the above-described BICM module may MIMO decode the DP data by using a MIMO decoding matrix having a MIMO decoding parameter. The MIMO decoding matrix may correspond to an inverse matrix of the above-described MIMO encoding matrix. The MIMO decoding parameter may correspond to above-described MIMO encoding parameter 'a'. The MIMO decoding matrix can have parameter 'a', since the MIMO decoding matrix can be an inverse matrix of MIMO encoding matrix.

In step of de-mapping from constellations, the above-described BICM module may de-map the MIMO decoded DP data from constellations according to one of QAM (Quadrature Amplitude Modulation), NUQ (Non-Uniform QAM) or NUC (Non-Uniform Constellation). The QAM, NUQ, NUC may correspond to above-described QAM, NUQ, NUC. The constellations may also be referred as a constellation set. The data in each DP path can be de-mapped from different constellations. For example, DP data in a DP path can be demapped from QAM, while DP data in other DP path can be demapped from NUQ.

In step of bit de-interleaving, the above-described BICM module may bit de-interleave the de-mapped DP data. The bit de-interleaving may correspond to above-described bit de-interleaving.

In step of LDPC decoding, the above-described BICM module may LDPC decode the bit de-interleaved DP data according to a code rate. The LDPC decoding can be an inverse process of above-described LDPC encoding. The LDPC decoding may correspond to above-described LDPC decoding.

In step of de-formatting, the above-described output processor may output process (de-format) the LDPC decoded DP data into output streams. The deformatting may correspond to above-described output processing.

In a method of receiving broadcast signal according to other embodiment of the present invention, the MIMO decoding is performed according to either FR-SM (Full-rate spatial multiplexing) method or FRFD-SM (Full-rate Full-diversity spatial multiplexing) method. The FR-SM method and FRFD-SM method may correspond to above-described MIMO encoding method, FR-SM and FRFD-SM, which also can be referred as PH-eSM PI and FRFD PH-eSM PI method.

In a method of receiving broadcast signal according to another embodiment of the present invention, the QAM, the NUQ and the NUC can be defined depending on the code rate.

In a method of receiving broadcast signal according to another embodiment of the present invention, the MIMO decoding parameter can be defined based on one of the QAM, the NUQ or the NUC. The MIMO decoding parameter may correspond to above-described 'a'. The MIMO decoding parameter can be determined constellations (QAM, NUQ or NUC) and/or a code rate, as described above.

The above-described steps can be omitted or replaced by steps executing similar or identical functions according to design.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

Various embodiments have been described in the best mode for carrying out the invention.

The present invention is available in a series of broadcast signal provision fields.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting broadcast signals, the method including:
    formatting input streams into Data Pipe (DP) data;
    Low-Density Parity-Check (LDPC) encoding the DP data according to a code rate;
    bit interleaving the LDPC encoded DP data;
    mapping the bit interleaved DP data onto symbols in NUC (Non-Uniform Constellation);
    Multi-Input Multi-Output (MIMO) encoding pairs of the symbols by using a MIMO encoding matrix having a MIMO encoding parameter, wherein value of the MIMO encoding parameter is defined based on types of the NUC being used in mapping;
    time interleaving the MIMO encoded data;
    building at least one signal frame by mapping the time interleaved data; and
    modulating data in the built signal frame by Orthogonal Frequency Division Multiplexing (OFDM) method and transmitting the broadcast signals having the modulated data.

2. The method of claim 1,
    wherein the MIMO encoding includes rotating the symbols in a pair, and applying complex phase rotation to one of the rotated symbols in the pair.

3. The method of claim 1,
    wherein the mapping the bit interleaved DP data further includes:
    mapping the bit interleaved DP data onto first symbols in a first constellation, and second symbols in a second constellation,
    wherein the first constellation and the second constellation is one of the NUC.

4. A method of receiving broadcast signals, the method including:
    receiving the broadcast signals having at least one signal frame and demodulating data in the at least one signal frame by Orthogonal Frequency Division Multiplexing (OFDM) method;
    parsing the at least one signal frame by de-mapping Data Pipe (DP) data;
    time de-interleaving the DP data;
    Multi-Input Multi-Output (MIMO) decoding pair of the time de-interleaved data by using a MIMO decoding matrix having a MIMO decoding parameter;
    de-mapping the MIMO decoded data from symbols in NUC (Non-Uniform Constellation), wherein value of the MIMO decoding parameter is defined based on types of the NUC being used:
    bit de-interleaving the de-mapped DP data;
    Low-Density Parity-Check (LDPC) decoding the bit de-interleaved DP data according to a code rate; and
    de-formatting the LDPC decoded DP data into output streams.

5. The method of claim 4,
    wherein the MIMO decoding includes applying complex phase rotation to one of the time de-interleaved data in a pair, and rotating the time de-interleaved data in the pair.

6. The method of claim 4,
    wherein the de-mapping the MIMO decoded data further includes:
    de-mapping the MIMO decoded data from first symbols in a first constellation, and second symbols in a second constellation,
    wherein the first constellation and the second constellation is NUC and NUQ.

7. An apparatus for transmitting broadcast signals, the apparatus including:
    a formatting module that formats input streams into Data Pipe (DP) data;
    a Low-Density Parity-Check (LDPC) encoding module configured that LDPC encodes the DP data according to a code rate;
    a bit interleaving module that bit interleaves the LDPC encoded DP data;
    a mapping module that maps the bit interleaved DP data onto symbols in NUC (Non-Uniform Constellation);
    a Multi-Input Multi-Output (MIMO) encoding module that MIMO encodes pairs of the symbols by using a MIMO encoding matrix having a MIMO encoding parameter, wherein value of the MIMO encoding parameter is defined based on types of the NUC being used in mapping;
    a time interleaving module that time interleaves the MIMO encoded data;
    a frame building module that builds at least one signal frame by mapping the time interleaved data;
    a modulating module that modulates data in the built signal frame by Orthogonal Frequency Division Multiplexing (OFDM) method; and
    a transmitting module that transmits the broadcast signals having the modulated data.

8. The apparatus of claim 7,
    wherein the MIMO encoding includes rotating the symbols in a pair, and applying complex phase rotation to one of the rotated symbols in the pair.

9. The apparatus of claim 7,
    wherein the mapping module maps the bit interleaved DP data onto first symbols in a first constellation, and second symbols in a second constellation,
    wherein the first constellation and the second constellation is NUC.

10. An apparatus for receiving broadcast signals, the apparatus including:
    a receiving module that receives the broadcast signals having at least one signal frame;
    a demodulating module that demodulates data in the at least one signal frame by an Orthogonal Frequency Division Multiplexing (OFDM) method;
    a parsing module that parses the at least one signal frame by de-mapping Data Pipe (DP) data;

a time de-interleaving module that time de-interleaves the DP data;

a Multi-Input Multi-Output (MIMO) decoding module that MIMO decodes pair of the time de-interleaved data by using a MIMO decoding matrix having a MIMO decoding parameter;

a de-mapping module that de-maps the MIMO decoded data from symbols in NUC (Non-Uniform Constellation), wherein value of the MIMO decoding parameter is defined based on types of the NUC being used;

a bit de-interleaving module that bit de-interleaves the de-mapped DP data;

a Low-Density Parity-Check (LDPC) decoding module that LDPC decodes the bit de-interleaved DP data according to a code rate; and a de-formatting module that de-formats the LDPC decoded DP data into output streams.

11. The apparatus of claim 10,
wherein the MIMO decoding includes applying complex phase rotation to one of the time de-interleaved data in a pair, and rotating the time de-interleaved data in the pair.

12. The apparatus of claim 11,
wherein the de-mapping module de-maps the MIMO decoded data from first symbols in a first constellation, and second symbols in a second constellation,
wherein the first constellation and the second constellation is NUC.

* * * * *